(12) United States Patent
Matthews, III et al.

(10) Patent No.: US 6,344,865 B1
(45) Date of Patent: Feb. 5, 2002

(54) USER FRIENDLY REMOTE SYSTEM INTERFACE WITH MENU SCROLLING

(75) Inventors: Joseph H. Matthews, III; David Wm. Plummer, both of Redmond; David A. Barnes, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/422,652

(22) Filed: Oct. 22, 1999

Related U.S. Application Data

(62) Division of application No. 08/917,857, filed on Aug. 27, 1997.

(51) Int. Cl.[7] ............................................... G09G 5/00
(52) U.S. Cl. .................... 345/815; 345/698; 345/699
(58) Field of Search .............................. 345/815, 600, 345/661, 670, 671, 698, 699

(56) References Cited

U.S. PATENT DOCUMENTS

| | | | |
|---|---|---|---|
| 4,823,283 A | 4/1989 | Diehm et al. | 345/352 |
| 4,896,291 A | 1/1990 | Gest et al. | 345/353 |
| 5,198,802 A | 3/1993 | Bertram et al. | 345/146 |
| 5,546,523 A | 8/1996 | Gatto | 345/352 |
| 5,581,685 A | 12/1996 | Sakurai | 345/353 |
| 5,596,373 A | 1/1997 | White et al. | 348/569 |
| 5,675,390 A | 10/1997 | Schindler et al. | 345/327 |
| 5,694,562 A | 12/1997 | Fisher | 345/349 |
| 5,748,254 A | 1/1998 | Harrison et al. | 348/552 |
| 5,734,853 A | 3/1998 | Hendricks et al. | 345/352 |
| 5,796,404 A | 8/1998 | Gentner | 345/352 |
| 5,805,763 A | 9/1998 | Lawler et al. | 385/83 |
| 5,815,160 A * | 9/1998 | Kikuchi et al. | 345/439 |
| 5,826,051 A | 10/1998 | Porter et al. | 345/345 |
| 6,008,803 A | 12/1999 | Rowe et al. | 345/327 |
| 6,215,467 B1 * | 4/2001 | Suga et al. | 345/132 |

OTHER PUBLICATIONS

AST Computer User's Manual, pp. 12–13, Feb. 1996.

* cited by examiner

*Primary Examiner*—Ba Huynh
(74) *Attorney, Agent, or Firm*—Banner & Witcoff, Ltd.

(57) ABSTRACT

A system, method, and medium for enhancing a GUI and viewing environment for a computer user is disclosed. Enabling a user to fully navigate and operate a computer through the use of a remote control device, the present invention includes at least a PC mode of operation and a theater mode of operation, wherein the theater mode is designed for distance use with the remote device. While operating in theater mode, received function key signals are interpreted by the computer system to operate various functions which have been modified to accommodate remote viewing and control. To enable the remote device to fully control the applications executable on the computer, the disclosed process notifies the various applications of the current operating mode.

28 Claims, 18 Drawing Sheets

USER FRIENDLY REMOTE SYSTEM INTERFACE WITH MENU SCROLLING

This application is a division of Ser. No. 08/917,857 filed Aug. 27, 1997, now pending.

BACKGROUND OF THE INVENTION

1. Technical Field

The present invention relates generally to an improved user interface for a computer operating system which provides different operating modes and enhanced features. The present invention is particularly useful in conjunction with an entertainment setting, such as when a computer is used from a distance and/or in conjunction with a television broadcast, movie, or a sporting event.

2. Related Art

The use of personal computers in connection with televisions and other mass media has recently become a reality. Some personal computers can now be equipped with plug-in television boards which permit viewing of a television broadcast in a window on the computer monitor. Additionally, so-called "large screen" televisions providing combined television and PC viewing capabilities have also been introduced. One such product, announced in 1996 by the Gateway Corporation, provides a personal computer system with a large viewing screen, and a wireless keyboard, remote control, and mouse.

The combination of personal computer functions with television and other media/entertainment functions creates several problems when a single viewing display is used for both functions. For example, traditional remote controls associated with televisions do not include keys which are useful for computer applications. Providing a separate remote control for the television and one for computer functions, however, unfortunately contributes to the proliferation of remote controls in a house.

The aforementioned Gateway product provides some limited support for controlling computer functions from an integrated remote control. However, it fails to solve many problems associated with providing computer functions in a large-screen setting. Moreover, displaying conventional computer-related functions on a television screen during a television broadcast clutters up the screen and detracts from the entertainment value of the programming. Thus, merely transferring computer related user interface features from a computer display to the larger screen format are disadvantageous.

As one example, computers which use a windows-based operating system such as Windows95 provide a "taskbar" display component at the bottom part of the screen which is normally fixed on the screen. This taskbar often includes a "START" button at the lower left hand corner which, when activated by the user via a mouse or keyboard, displays a list of options for starting or "launching" applications. Displaying such a taskbar while watching a television program detracts from the program and takes up valuable display space. Moreover, when a user is sitting on a couch, requiring the user to use a mouse or keyboard to activate the start button is inconvenient. Once the user launches an application program, it is a further inconvenience to require that the viewer use a keyboard or mouse to activate various pull-down menus and the like for the application program. Consequently, the conventional display model for launching and interacting with programs in a windowed environment cannot be readily adapted to a remote control television environment.

Another computer feature normally provided in a windowed display environment such as Windows95 is a display menu with multiple choices which can be selected by mouse or keyboard. For example, pressing the "START" button in Windows95 causes a display to be generated with options such as Programs, Settings, Find, Help, Shut Down, etc. The underlined characters in the previous list represents "accelerators" which permit the user to quickly select a desired item by pressing a single keyboard key (e.g., "p", "s", or "u") rather than scrolling through the list with a mouse or arrow key. Unfortunately, if a viewer uses a remote control device which lacks alphabetic characters, these shortcut selection techniques cannot be used. Moreover, the choices are not mutually exclusive (e.g., note that the letter "S" does not uniquely distinguish between "settings" and "shut down"; thus, the alternative "u" designator must be used to select "shut down"). Although one solution is to force the user to scroll up or down using arrow keys to select a choice, this is not always convenient for a remote user. Consequently, a need exists to improve the way in which a user navigates through a menu list when using a remote control device to control computer functions. Moreover, providing a conventional cascading type menu display in an entertainment environment uses up valuable display space, causing for example a television program to be obscured with menu options.

Some keyboards include an "Application" dedicated key which may be configured by software. Pressing such a button, for example, may cause a menu to be shown with options such as cut, paste, copy, etc. However, the button operates the same way regardless of the display mode in which computer is operating.

Another problem which can occur when computer functions are implemented on a large screen such as a large-screen television display is that menu selection choices are not adequately distinguishable from the background. For example, if a television program is displayed on the screen and the user activates a menu to select a choice, the conventional menu choice highlighting techniques may not permit the selected choice to be clearly distinguished against the moving background. Consequently, a need exists to enhance highlighted menu choices in such an environment.

Another problem which occurs when a computer function is implemented on a large-screen display is that screen display resolutions which are suitable for a smaller screen display may not be suitable for a larger screen. Merely allowing the user to change the resolution size on the larger screen, as is conventional, does not adequately permit the viewer to control how large the resulting window elements are. For example, switching the screen resolution to 800 by 600 pixels for a large screen TV will result in smaller icons and menu items, thus detracting from the advantages of using a larger screen. Consequently, a need exists to permit the user to more flexibly control the size of screen components in relation to different variables.

Yet another problem concerns how application programs behave in a windowed operating system such as Windows95. The conventional application programming model assumes that other application programs can be simultaneously executing, but does not take into account the fact that a television program or movie may be in progress on the computer display, and does not take into account the fact that in such a "theater mode" environment the user may have access only to a simple remote control device rather than a conventional keyboard or mouse. Consequently, a need exists to provide an enhanced mode in which application programs behave differently when a theater mode has been activated, in order to simplify the operation of the applications when a remote control is used.

Finally, conventional techniques for indicating to a user the contents of a folder (e.g., text files, executable programs, sound files, movies, etc.) often lack sufficient detail to permit the viewer to recognize the nature of the contents of any particular item. For example, the user may merely be provided with an indication that a folder contains 3 text files, a word processor application, and a movie having a particular name. The user must actually start the movie to see whether the movie is a desirable one, and the user must either open the text files or launch a viewer application to display partial contents of the text file. In short, there is no easy way for the user to quickly determine whether any particular folder item is of interest.

SUMMARY OF THE INVENTION

The present invention generally relates to an operating environment for controlling a computer using limited input devices, such as a remote control device. Through providing an enhanced operating environment directed to limited input control as well as a system and method for transitioning to and from the enhanced remote operating system, the problems of the prior art are overcome.

The present invention provides a graphical user interface usable to control a computer system using, for example, a remote control device which includes buttons enabling specific functions to aid in the operation of the computer. In order to compensate for the large distance between a user and a large-display, the present invention provides simplified features which permit the user to fully control computer functions on a large screen.

To facilitate such control, an enhanced remote control having two additional buttons, a start button and a menu button, is employed. The start button may be application independent and allows a user to quickly pick between available applications or tasks. The menu button is contemplated to be application dependent in that the options available through its operation may be tailored to the currently running application. For example, if running a spread sheet financial program, pressing the menu button may provide spread sheet specific menu options including applications and tasks like copy cell, copy formula, etc. If running a CD player program, pressing the menu button may provide CD specific menu options including play, pause, stop, reverse, fast forward, etc.

To facilitate the easy selection of a popular application or task, the present invention includes numerical accelerators which are displayed on a user's display corresponding to available menu items. To select a specific application or task a user presses the appropriate numerical button on the user's remote control.

To facilitate the user's navigation through multiple levels of menus, the present invention includes the use of enhanced scrolling techniques to allow users to quickly select applications from listed choices without navigating through multiple levels of nested or cascading menus.

The present invention also includes highlighting selections of a selection menu so as to enable a user to determine easily from a distance the current position of a selection menu. For example, one way of highlighting the current selection is through the use of a focus frame, an enlarged frame encircling the current selection. The invention also uses alternative colors to represent the current selection, either in combination with the focus frame or without the focus frame.

To assist a user in determining information about a listed application, the present invention includes previewing the listed applications through a preview frame. The preview frame displays information relating to the contents of a folder. To enable faster access of the preview frame as well as prevent unnecessary loading of system memory with an application before the application is actually requested by the user, the invention determines the identity of a current selection and retrieves the contents of a data structure which includes the preview information of the current selection item. Instead of the actual selection being loaded, a short preview of the application, or other material (a commercial for another application or product) may be displayed. Notably, the information as displayed by the preview function described herein is not required to originate with the original application. The preview information may include textual information, graphics, videos, sound clips and the like. The invention also supports interactive previews. For example, while displaying a preview of a game, a user may be allowed to at least minimally interact with the preview to create the perception of actually playing the game embodied in the current selected application.

Further, the present invention includes the addition of a second graphical user interface mode directed to current PC operating functionality (requiring a more sophisticated input device such as a mouse and/or a full keyboard, for normal operation). The operating system of the present invention supports an ability to switch between the first and second graphical user interface modes based on the input device used to control the operating system. For example, when a user presses a key on a keyboard, the system may switch to a normal PC mode of operation. Likewise, when a user presses a key on a remote control, the system may switch back to a theater mode of operation.

As a user switches modes of operation, the various applications are alerted to the change of mode of operation so that, when actually executed, the various applications present a GUI tailored for control via a limited input device from a distance. For example, the applications are modified to be viewed and controlled from a distance using enlarged font types, minimized nesting of options, and context sensitive function keys which change their operation based on the running application.

Other features and advantages will become evident through the following detailed description, figures and claims.

DETAILED DESCRIPTION OF THE INVENTION

Figure 1:
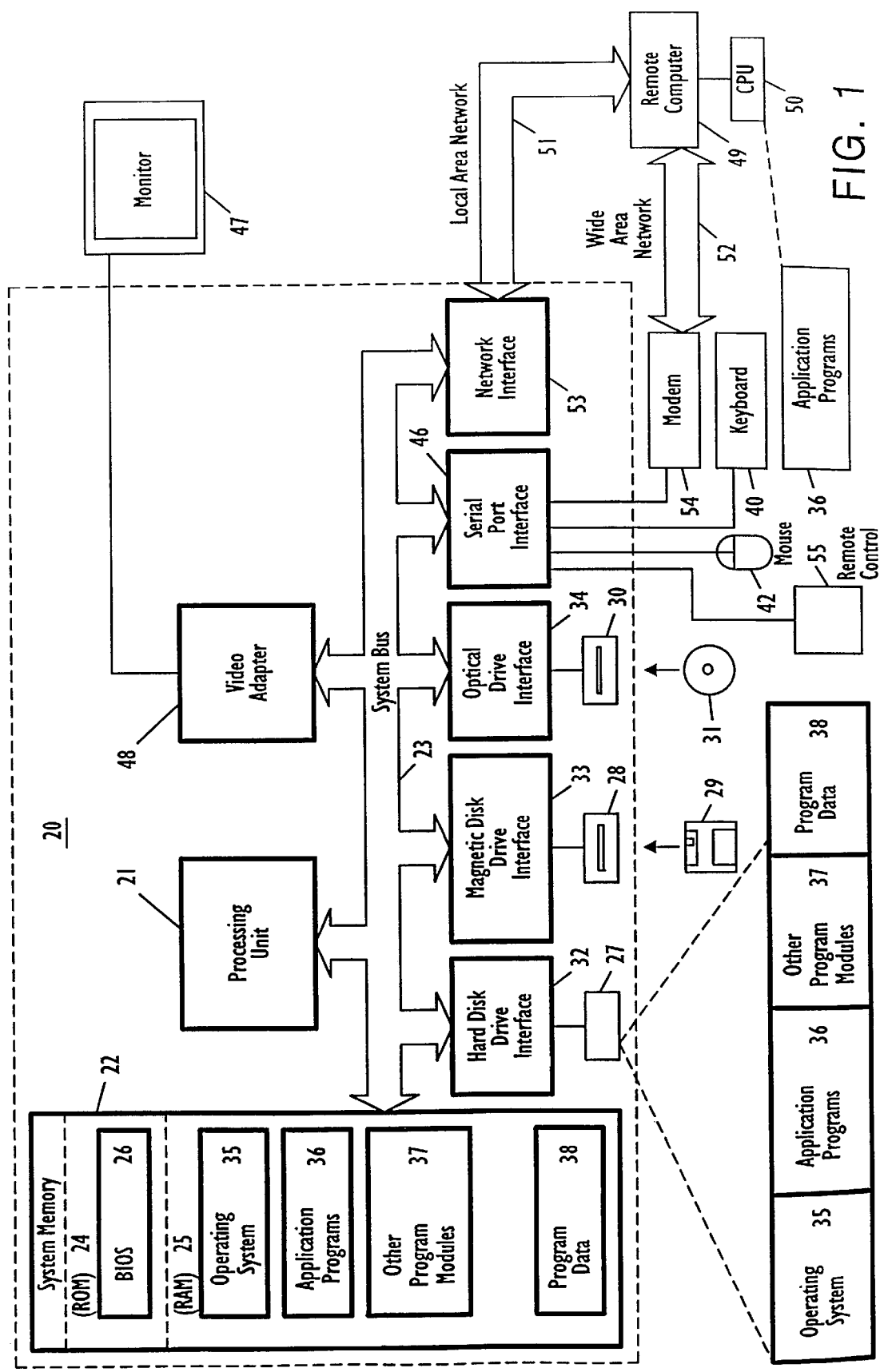
FIG. 1 shows a computing environment suitable for use in conjunction with embodiments of the present invention.

FIG. 1 and the following discussions are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help transfer information between elements within the personal computer 20, such as during star-up, is stored in ROM 24. The personal computer 20 further includes a hard disk drive 27 for reading from and writing, to a hard disk, not shown, a magnetic disk drive 28 for reading from and writing to a removable magnetic disk 29, and an optical disk drive 30 for reading from or writing to a removable optical disk 31 such as a CD ROM, or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital versatile disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40, a pointing device 42, and a remote control 55. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device (such as a large screen TV set) is also connected to the system bus 23 via an interface, such as a video adapter 48. Monitor 47 includes computer monitors, LCD panels, TV monitors, and the like. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52 such as the Internet. The modem 54, which may be internal or external, is connected to the system bus 23 via the serial port interface 46. In a networked environment, program modules depicted relative to the personal computer 20, or portions thereof may be stored in the remote memory storage device. It will be appreciated that the network connections shown are exemplary and other means of establishing a communications link between the computers may be used.

An additional input to serial port interface 46 comes from remote control 55. In this regard, the remote control 55 allows for remote operation of the computer system including the components and applications found therein.

Figure 2:
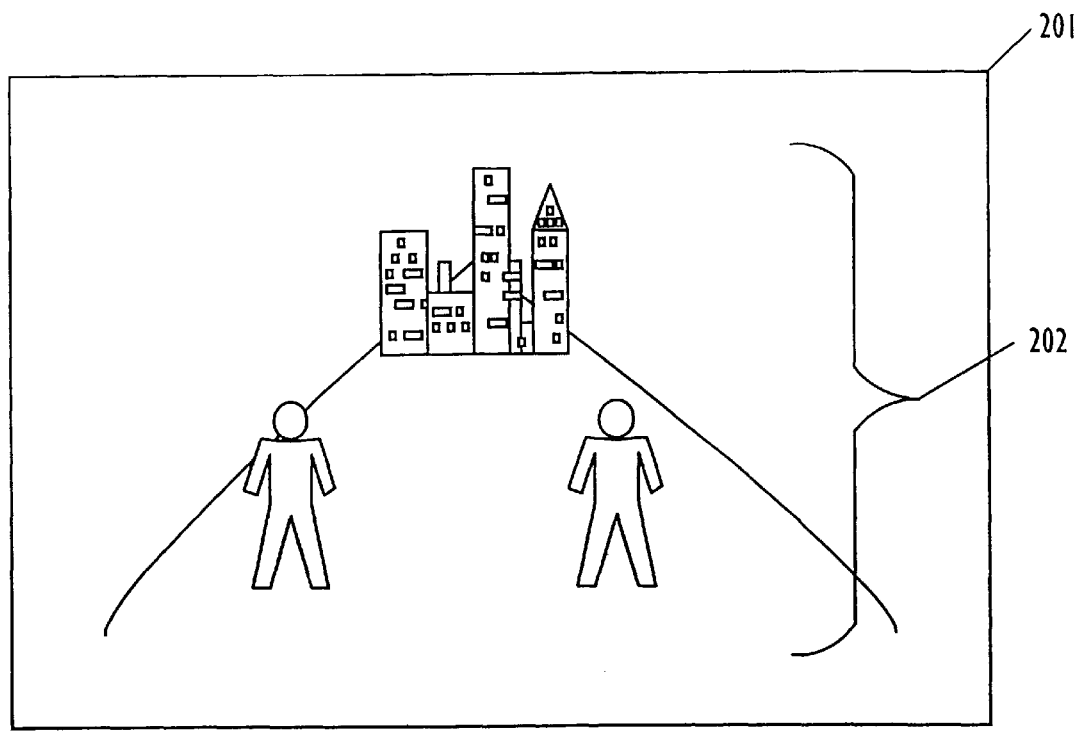
FIG. 2 shows a screen image without a task bar or start button as contemplated by embodiments of the present invention.

FIG. 2 shows an embodiment of a viewable display according to the theater mode of the present invention. It is assumed that the image is displayed on a large screen such as a projection-type TV. When the operating system is functioning and a by user is not currently engaged in an application, the operating system outputs a full screen of an image 202. An advantage of hiding all buttons, bars, icons, and the like while watching a displayed image (for example, while watching TV) is that the application model presents a unified functionally simple interface with no distractions. As different applications are executed, embodiments of the present invention contemplate each application consuming the entire viewing area 201 so as to provide to the user the largest possible amount of information even though the user may be several feet from the monitor.

Figure 3:
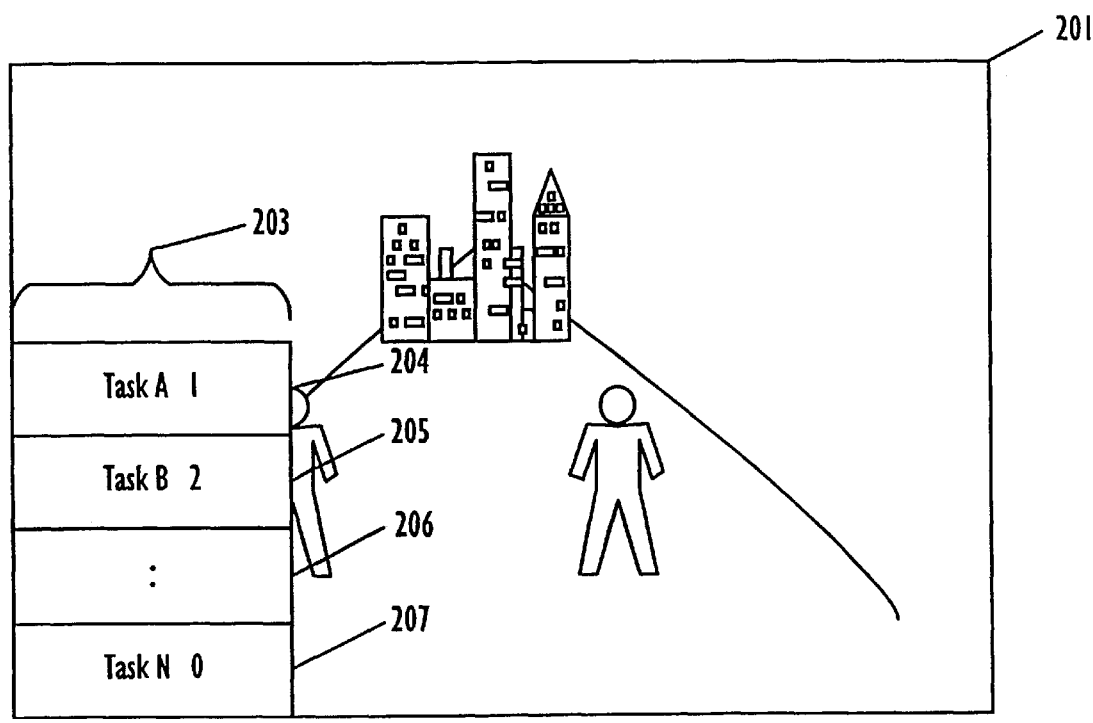
FIG. 3 shows a screen image including a start menu but no task bar as contemplated by embodiments of the present invention.

FIG. 3 shows display 201 after a user has requested that a start menu appear. A start menu, as used herein, relates to a menu displaying a list of running and available applications. In one embodiment of the invention, the start menu does not distinguish between running and available applications. This is to minimize what a user has to consider in selecting an application. To this end, the switching function is handled by the operating system rather than by the user. As contemplated by embodiments of the present invention, the start menu 203 is displayed upon request of a user when the user presses a dedicated start button on a remote control device or a keyboard. Once pressed, the keyboard or key pad transmits a signal to the host computer requesting a display of the start menu 203. In response, the host computer outputs a video command to display the start menu 203. As shown in FIG. 3, the start menu 203 is displayed with the various tasks or applications listed therein. In particular, start menu 203 includes task A 204, task B 205, other tasks 206, and, finally, task N 207. Alternative embodiments of the invention contemplate the start menu being displayed at a variety of different locations on the display, the top, the sides, etc. Additionally, in order to enhance the appearance, the start menu may slowly slide onto the display over a time span of approximately 400 milliseconds.

Each task as shown in FIG. 3 has a numeric accelerator associated with it. A numeric accelerator is a number which is has a corresponding button on remote 55 or 401. To quickly select a task, a user need only press the button corresponding to the numeric accelerator displayed with the desired task. For example, task A 204 has numeric accelerator 1, task B 205 has numeric accelerator 2, and task N 207 has numeric accelerator 0. The numeric accelerators in one embodiment are single numerical digits which uniquely identify a selected item. The advantage of single numerical digits is that they are easily represented by existing numerical buttons on a standard remote control. Of course, in alternate embodiments multiple digits could also be used to represent accelerators, for example, by timing the speed of the user input to discern whether a user was attempting to select a single or multiple digit accelerator. In addition, symbols other than digits could alternatively be used. Such symbols could be associated with existing or new buttons on the remote, preferably a single digit which uniquely identify a selected item.

Figure 4:
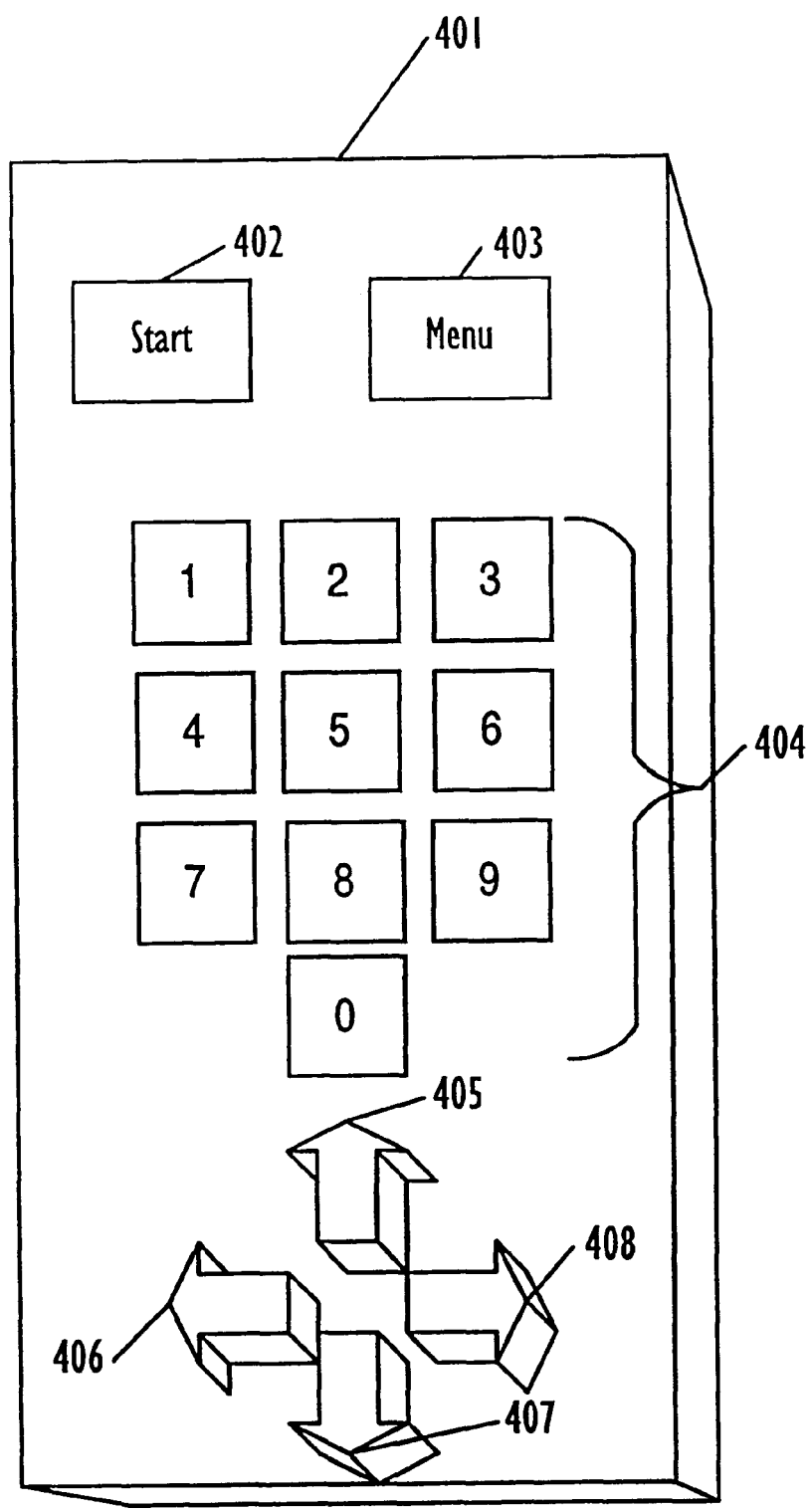
FIG. 4 shows a remote control with start and menu buttons as contemplated by embodiments of the present invention.

FIG. 4 shows remote control 401 similar to that of remote control 55 as shown in FIG. 1. Remote control 401 includes numeric keypad 404 and directional arrows 405, 406, 407, and 408. In particular, remote control 401 includes two additional buttons which support additional functionality for the remote control. Using start button 402, menu button 403, and numeric keypad 404, a user is able to launch applications, select menu items, and operate application programs without the need for a mouse or alphanumeric keyboard. Further, while the terms "start" and "menu" are used repeatedly herein, the terms are intended to be used generally as related to the operations performed by them. In this regard, other names may be readily associated with these functions. For example, the name "begin" may replace "start" and "list" or "function" may replace "menu".

Numeric accelerators (corresponding to the available keypad symbols) are assigned to applications or tasks available for execution and displayed on the start menu. In one embodiment of the present invention, tasks or applications are stored in a specified location in memory with application identifiers pointing to the tasks or applications. Representations of the application identifiers are displayed on the start menu. For example, the actual executable tasks or applications may be stored in a specific location on a hard drive or other memory with the application identifiers stored in a file or directory specifically for start menu items.

Figure 5:
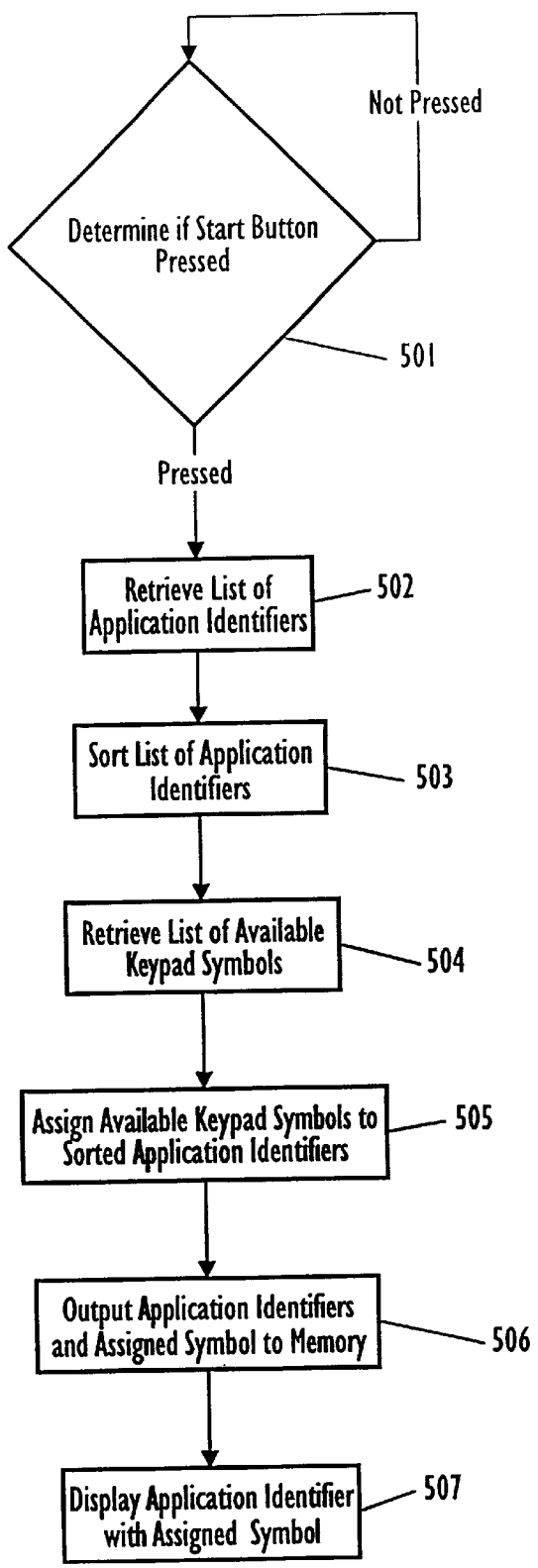
FIG. 5 shows a flowchart of a process for assigning and displaying accelerators with applications on a menu as contemplated by embodiments of the present invention.

FIG. 5 shows one process used to display the start menu items in conjunction with assigning application identifiers. In step 501, a wait loop waits for a start button to be pressed. Once pressed, the process retrieves the stored list of application identifiers in step 502. Next, the process sorts the list of application identifiers in step 503. The sorting process may include alphabetical sorting, running v. not running sorting, user definable sorting, etc. After sorting, the process retrieves the list of available keypad symbols (e.g., numerals 0 through 9) in step 504 and assigns the available keypad symbols to the sorted application identifiers. The application identifiers with assigned symbols are output to memory in step 506 and, finally, the system displays the combination of the application identifiers with the assigned symbols in step 507. Alternatively, the application identifiers may be initially assigned once to the symbols and, from then on, each successive display of the start menu displays the preset combinations.

Figure 6:
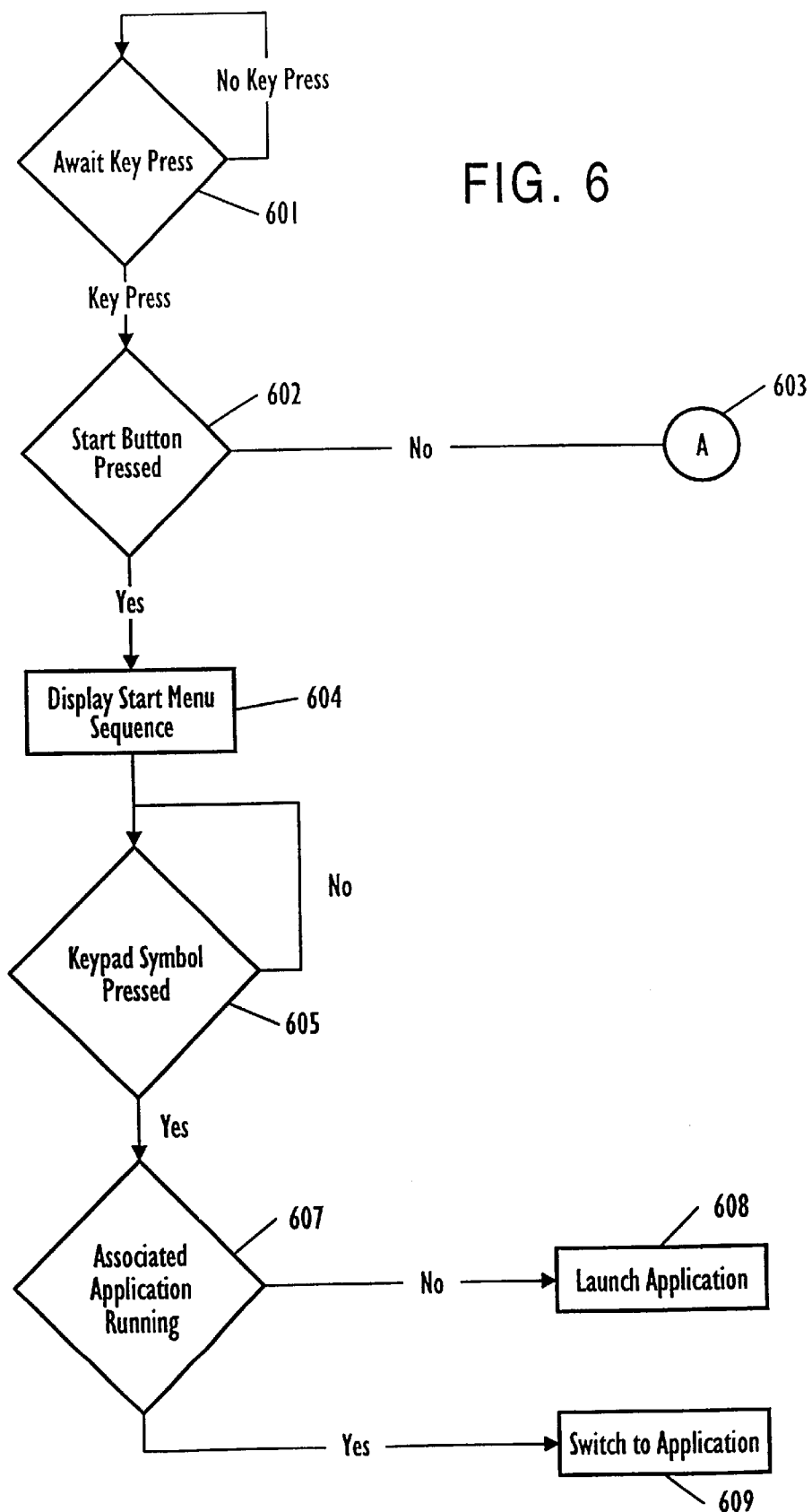
FIG. 6 shows a flowchart of a process for accelerating selection of applications using the symbols assigned with respect to FIG. 5 as contemplated by embodiments of the present invention.

FIG. 6 shows a process for using the numerical accelerators. Upon detection of a key press in step 601, the process determines whether a start button was pressed. If the start button was not pressed, then the process responds to the key press as appropriate as represented by point A 603 (as later described in connection with FIG. 10). If the start button was pressed, the process displays at step 604 the start menu as previously described with reference to FIG. 5. Once a keypad symbol associated with a numerical accelerator is pressed, step 605, the process attempts to access the application or task identified by the numerical accelerator as shown in step 607. At any time, a user may press the start button again to return back to the currently active application. Finally, in step 607 the process determines whether the application was previously launched, and, if currently running, switches the current context to the running application, step 609, otherwise, it launches the application, step 608.

The tasks or applications 204 through 207 of the present invention may include a variety of user-definable tasks or applications including the option of define one task as a folder or collection of other tasks. For example, a user (or the system) may define one task as a games folder containing a collection of games. By selecting the games folder (by, for example, highlighting the games task and pressing the enter key) the start menu is expanded to display a menu listing of the selectable games. The representation and selection of these sublevel tasks are explained in greater detail with respect to FIGS. 7 and 8.

Figure 7:
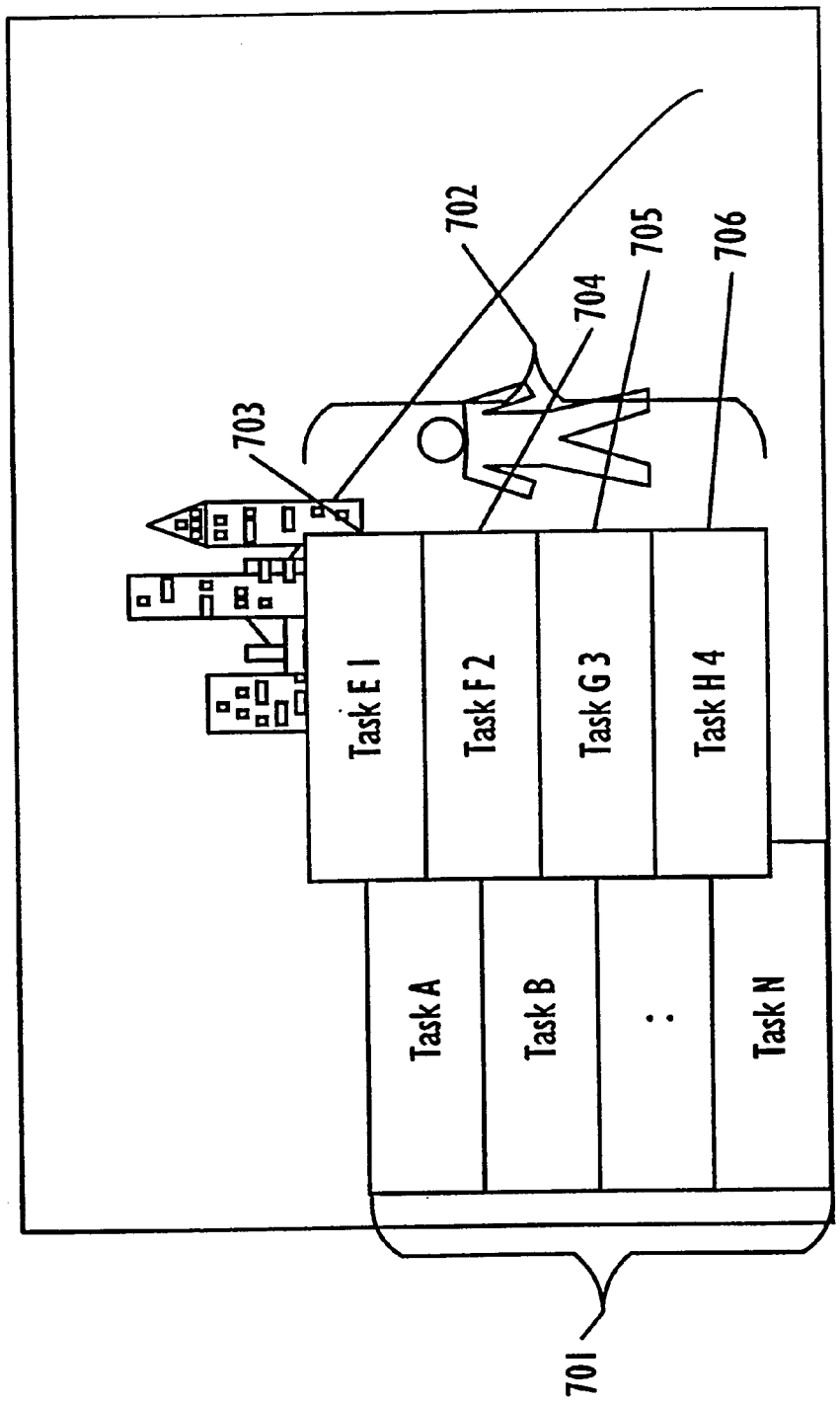
FIG. 7 shows first and second related start menus as contemplated by embodiments of the present invention.

FIG. 7 shows the start menu 203 of FIG. 3 after the games folder of the above example has been selected. The original set of tasks A through N is displayed as start menu 701 without numerical accelerators and with sublevel start menu 702 juxtaposed to start menu 701. New tasks E through H now have numerical accelerators 1 through 4, respectively, which replace (and re-define) those previously associated with tasks A through N. The process by which tasks E through H are chosen is similar to the process as shown in FIG. 5.

The combination of nested tasks or applications through multiple levels of start menus allows a user to input various combinations without confusion. Also, if the user remembers the keystroke combination of accelerators which accesses nested applications, the user may input the combination and quickly be transported to the end task without substantive delay. Embodiments of the present invention provide a process for quickly processing the input keystrokes corresponding to displayed accelerators as shown in greater detail in FIG. 8.

Figure 8:
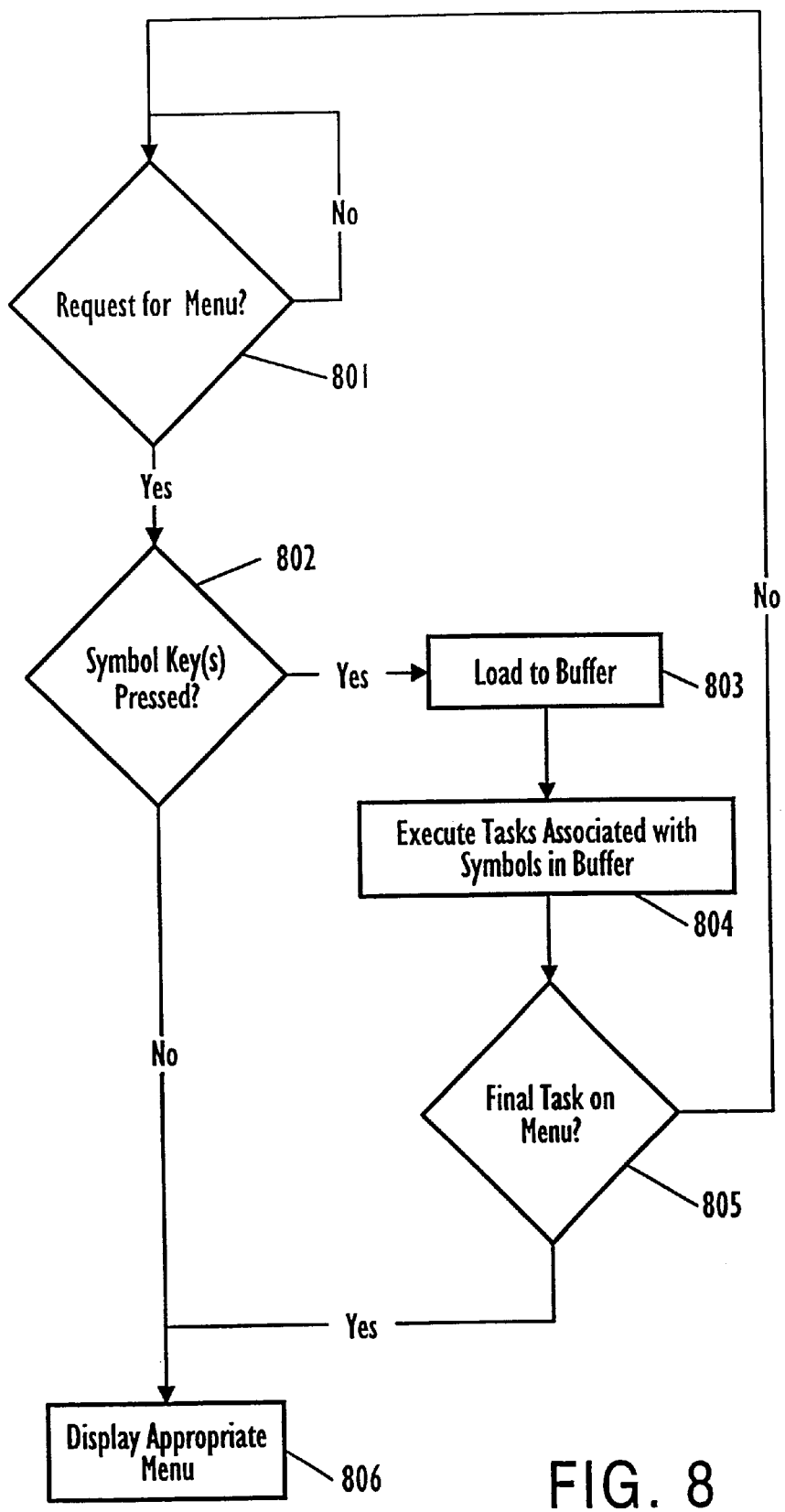
FIG. 8 shows a flowchart of a process for buffering inputs of selection symbols as contemplated by embodiments of the present invention.
Figure 9:
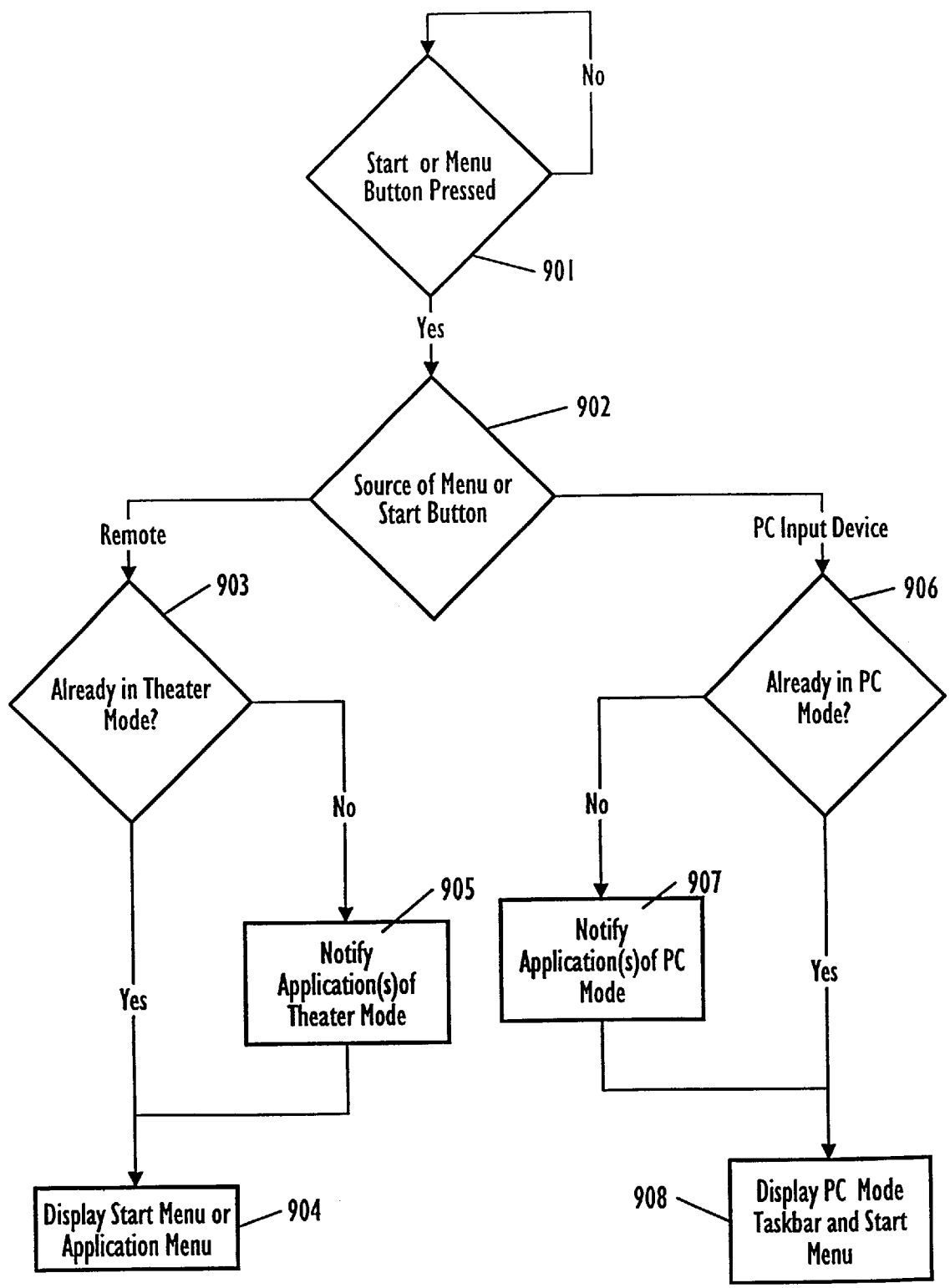
FIG. 9 shows a flowchart of a process for switching between modes of operation as contemplated by embodiments of the present invention.

FIGS. 8 and 9 show flowcharts for decision making processes resident in the system for operation on selected start menu selections. Also shown are references to a menu which is described in greater detail herein with respect to FIGS. 10 through 12. The menu relates to the pull down menus available in various graphical user interface (GUI) applications.

As shown in FIG. 8, the process waits at step 801 until a request for a start menu is received. Once a start menu request has been received, the process determines whether one or more accelerator keys have been pressed. If no such keys have been pressed, the process displays the appropriate start menu in step 806 then returns to step 802. If a symbol key was pressed in step 802, then the process loads the pressed symbol to a buffer as shown in step 803. As shown in step 804, the process attempts to match and execute the tasks selected by the pressed keys. Finally, as shown in step 805, if the final task requires the display of a menu, then the process branches to step 806. Otherwise the last task is implemented and the system again waits at step 801 for another request for a start menu. In summary, the process shown in FIG. 8 permits a user to quickly launch applications without waiting for a previous application to launch or a menu to be displayed.

To facilitate the use of the system as shown in FIG. 1, multiple modes of operation may be provided. In a first "PC mode", applications operate as conventionally configured to receive input from a keyboard and other input devices. In a second "theater mode", applications receive a different type of input, where the input is geared to remote control of the computer system through a limited interface device. In one embodiment, the primary input device for the theater mode is a remote control device such as remote control 401 of FIG. 4. Likewise, the primary input devices for the PC mode are primarily the keyboard 40 and mouse 42 of FIG. 1. In particular, applications are informed of what mode the system of FIG. 1 is currently operating. The user may select a particular mode by actuating keys on either the remote control or keyboard. In one embodiment, pressing any key on the remote control causes the system to switch into theater mode, while pressing any key on the keyboard causes the PC mode to be actuated.

As shown in FIG. 9, when the start button 401 or the menu button 402 is pressed, the process moves from step 901 to step 902. Next, the system attempts to determine the origin of the start or menu selection in step 902. If the source of the start or menu button was remote 55, then the process branches to step 903. If the source of the start or menu button was the PC input device, then the process branches to step 906. From step 903, the process determines whether the system of FIG. 1 is already operating in theater mode and, if so, displays the theater mode version of the start or menu button 904. If the system of FIG. 1 is not in theater mode, then the process branches to step 905 where it switches the mode to theater mode and informs other running applications that the theater mode has been initiated. From step 905 the process branches to step 904. If the input device from step 902 was a PC input device, then the process branches to step 906 where the process determines whether the system of FIG. 1 is operating in PC mode. If the system is in PC mode already, the PC mode task bar and start menu are displayed. This may comprise, for example, a conventional taskbar and start menu provided in Windows95. If the system is not already in PC mode, the process branches to step 907 where PC mode is initiated and other running applications are informed of the conversion to PC mode. Finally, step 908 is initiated at the conclusion of step 907.

In one embodiment, the menu for the various modes is mode sensitive. Accordingly, when in different modes, different menus may be displayed for the same function (e.g., "start"). Also, the menu is application sensitive. Accordingly, when in different applications, pressing the menu button may display different menu options.

Figure 10:
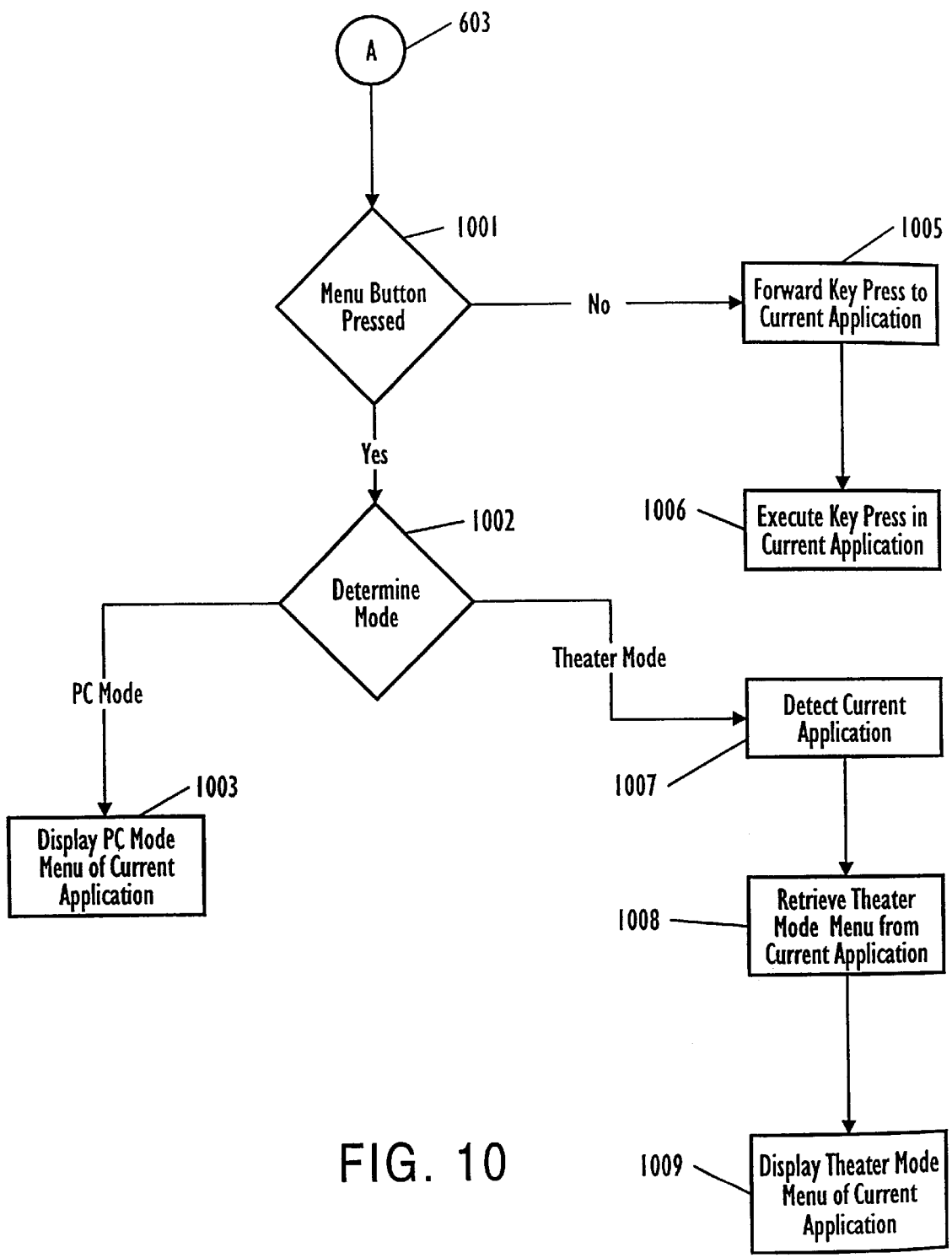
FIG. 10 shows a flowchart of a process for displaying an application specific menu as contemplated by embodiments of the present invention.

FIG. 10 shows a flowchart for an operation of the menu across the different modes. From point A 603 of FIG. 6, the process determines whether the menu button was the received key press (step 1001). If the menu button was not pressed, then the key press is forwarded to the currently active application, if any, (step 1005) and the current application executes the key press accordingly. If no applications are running, the system displays a desktop window which can host a combination of files, controls, web pages, etc. For example, the desktop may be set to display a television picture.

If a received key press in step 1001 was the menu button, then the process determines the mode of operation of the system of FIG. 1 in step 1002. If running in PC mode, the process commands the currently active application to display its PC mode menu. However, if the operation of the system is in theater mode, the system detects which application is currently running. From step 1007, the process commands the currently active application to display its theater mode menu.

Figure 11:
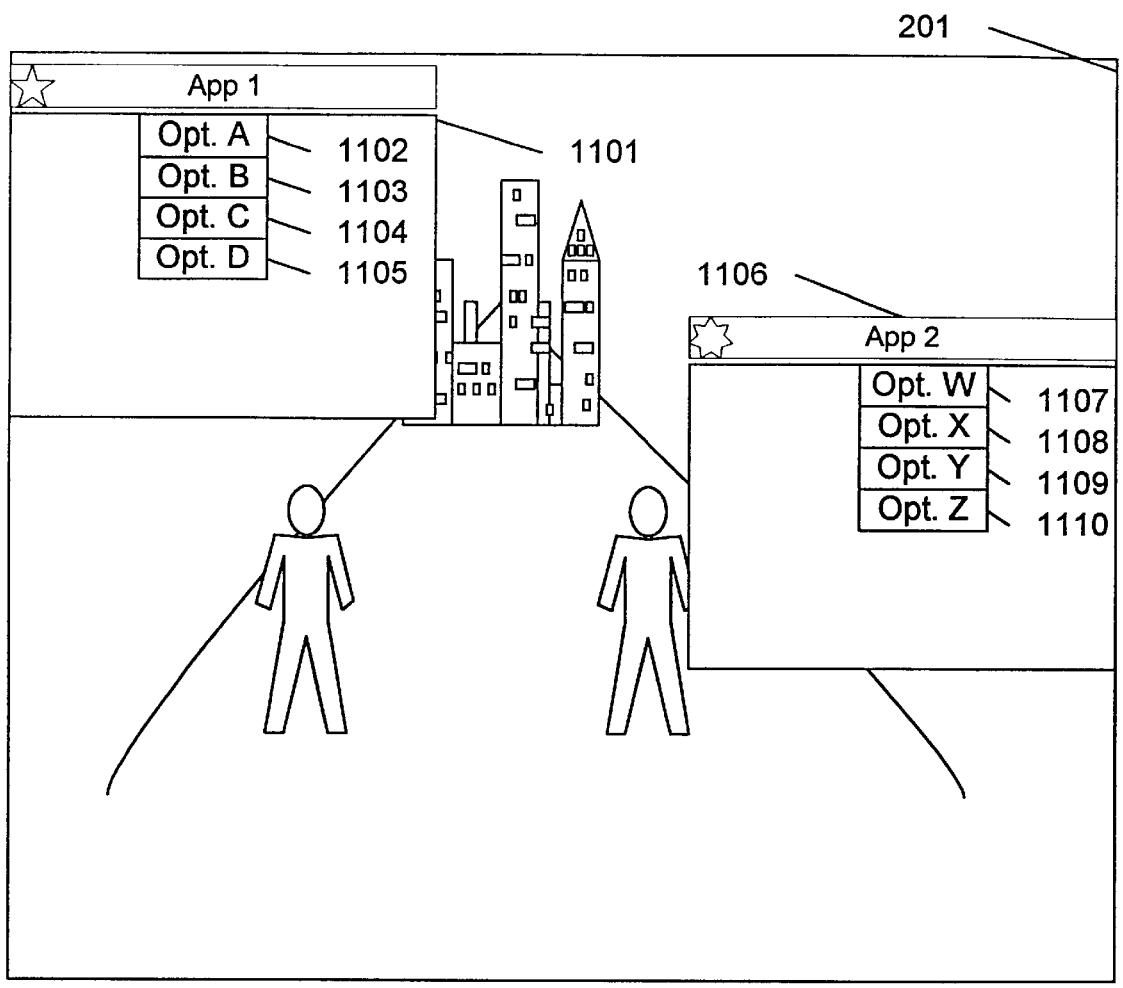
FIGS. 11 and 12 show application specific menus displayed with various applications.
Figure 12:
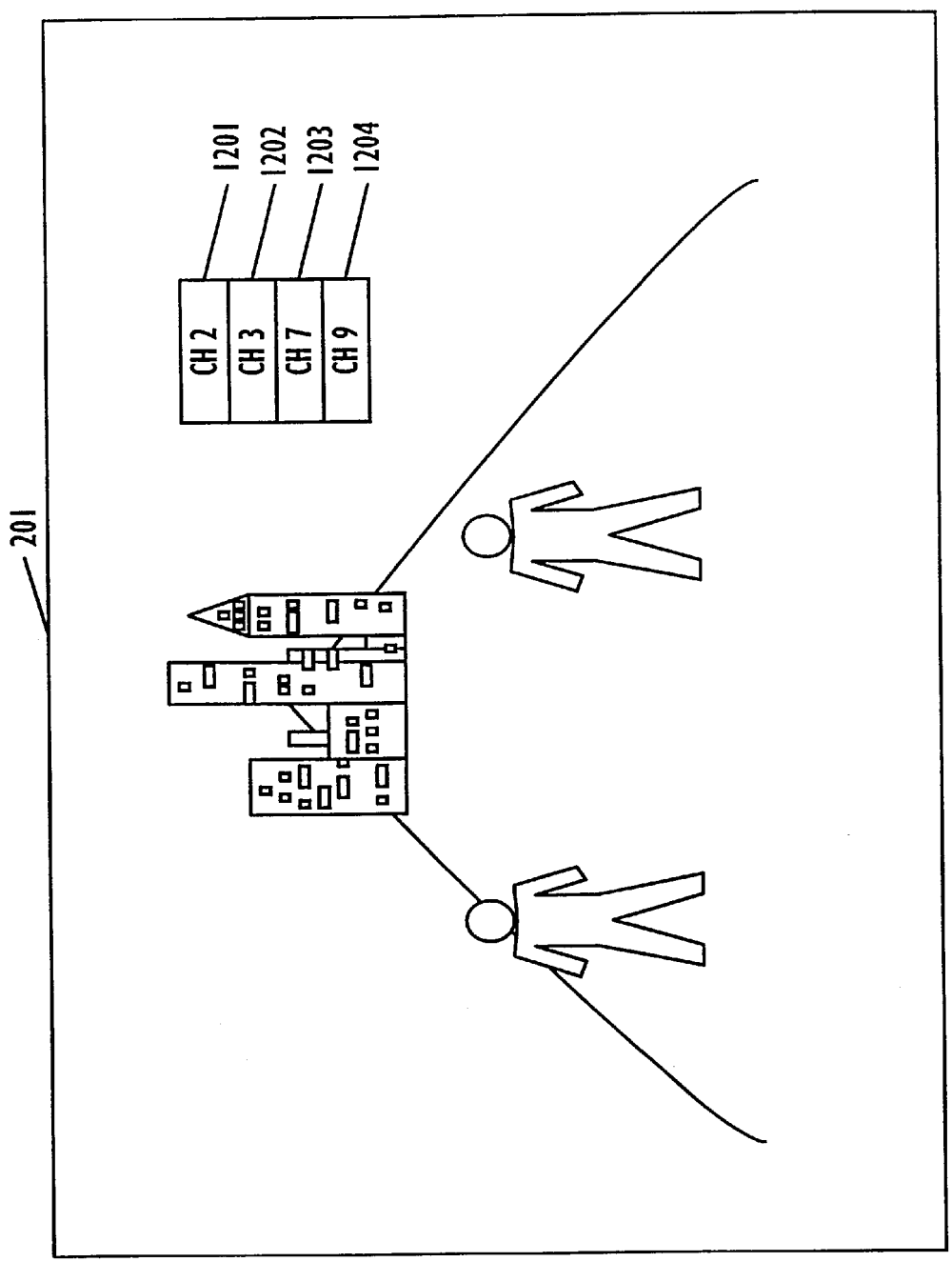

An example of various menus retrieved in theater mode is shown in FIGS. 11 and 12. Referring to FIG. 11, display 201 shows two applications currently running in theater mode. First application 1101 shows a menu with options A 1102, B 1103, C 1104, and D 1105. Second application 1106 shows a menu with options W 1107, X 1108, Y 1109, and Z 1110. FIG. 12 shows another application running in theater mode in which the application is the television viewing mode. In one embodiment, pressing the menu button with no applications selected causes a display of available channels such as channels 2 1201, 3 1202, 7 1203, and 9 1204. Providing a theater mode menu for each application (in addition to traditional menus in PC mode) permits the viewer to control applications using a simple remote control device.

First application 1101 and second application 1106 include an identifying title bars conveying an identifying icon and the title of the application. The title bar may remain hidden during use, be selectively present during operation, or may be constantly displayed in conjunction with the application. When selectively displayed, the title bar may be displayed in response to the press of a menu button. Also, the title bar may be displayed whenever the application chooses to display the bar.

Current monitors, such as monitor 47 of FIG. 1, can display a variety of screen resolutions. For example, typical monitors can display from 640×480 lines of resolution to 1024×780 lines of resolution or more. However, when the user changes screen resolution, the pixel resolution and thus size of all items (including menus) are changed.

Figure 13:
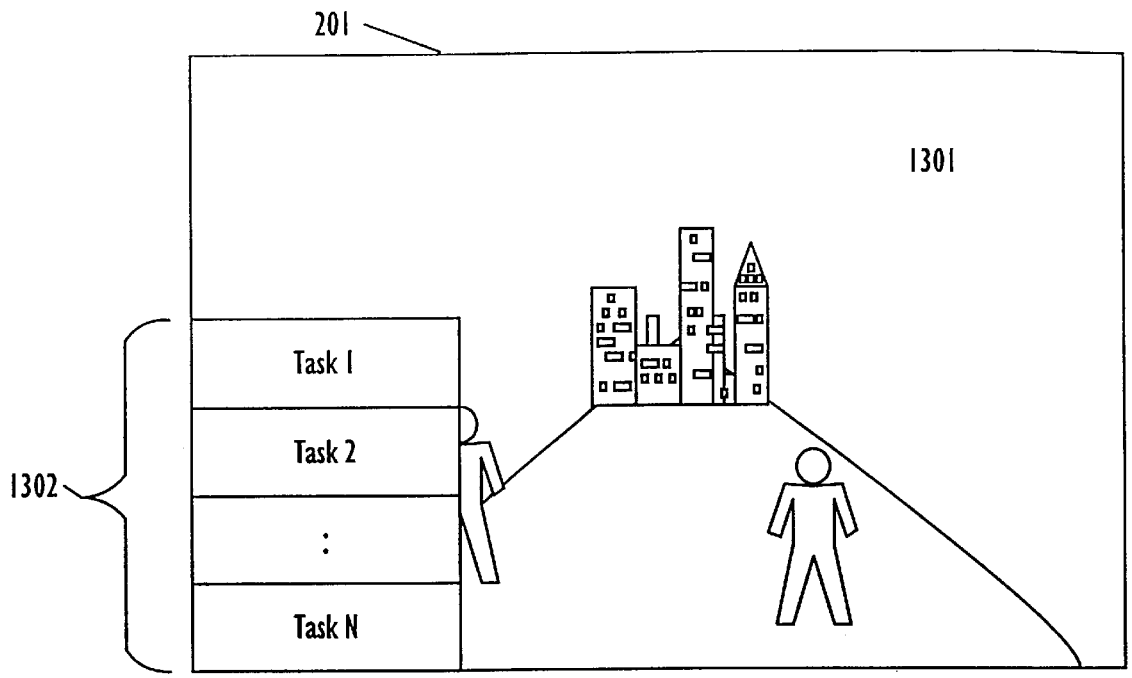
FIGS. 13, 14, and 15 show start menus of a registered size on screens of various resolutions.
Figure 14:
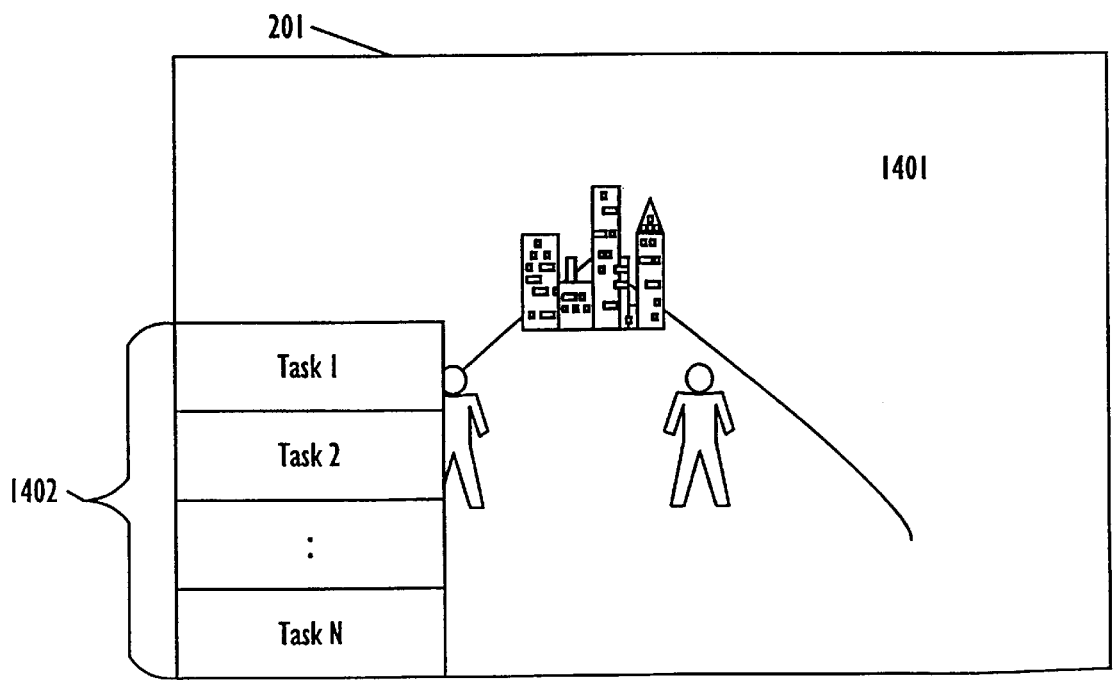
Figure 15:
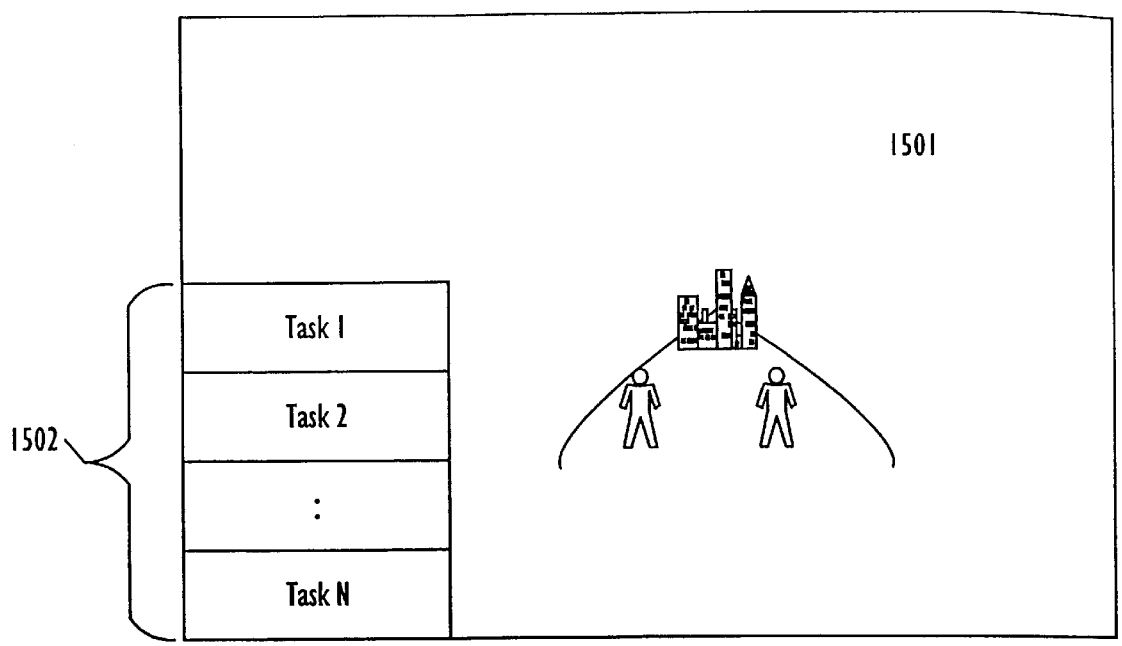

FIGS. 13 through 15 show user interfaces 201 as scaled through the changes in resolution. In accordance with the present invention, the start menu maintains a relatively consistent size between resolution changes so as to maintain the ability of a user to read the start menu at a distance. FIG. 13 shows an image 1301 with start menu 1302 of a given size. FIG. 14 shows image 1401 corresponding to image 1301 but at a higher resolution. In FIG. 14, the start menu 1402 is maintained the same size as that of the start menu 1302. Finally, FIG. 15 shows image 1501 at highest resolution with start menu 1502 at the same size of start menus 1302 and 1402.

In summary, the user can decide how big on the screen the menus should be, wherein the size is determined by a ratio of screen size to menu size. In one embodiment, all content is offered at 640×480 pixel resolution as the largest resolution. Two variables can be provided to the user to permit control over menu size. The first variable is the ratio N (the "resolution factor") of the current resolution to the resolution of the predefined resolution of the menu to be displayed (the "authored resolution"). Various ways exist to calculate the ratio between resolutions including comparing a ratio of horizontal resolutions, vertical resolution, or a combination of both horizontal and vertical resolutions. In the following example, the system compares the horizontal resolutions to arrive at the resolution factor N of 1.25.

Current screen resolution: 800 (h)×600 (v)

Authored screen resolution: 640×480

Resolution Factor N=800/640=1.25

The system may then determine the size of the menu to be displayed by multiplying the resolution factor by the specified size of the authored item. For example, where an authored pixel size is 400 pixels in 640×480 resolution, the new pixel size (from the above example) is:

$$N \times 400 = 1.25 \times 400 = 500 \text{ pixels.}$$

In this regard, application of the resolution factor allows scaling of provided image sizes between varying screen resolutions. Net, the system applies the resolution factor to derive the size of an item to be displayed in the current screen resolution. Through calculating and applying the resolution factor, the system may maintain a constant menu size (or item size) across varying screen resolutions.

The second variable is the "bigness" or sizing factor which may be set by a user to vary the amount of information available on a display by changing the size of the displayed information. The bigness factor may range from 0.0 to 1.0, but this range may be constrained to 0.5 to 1.0 so as to prevent a user from inadvertently shrinking the size of displayed information beyond a usable size. The bigness factor is multiplied by the pixel size of an image as calculated from application of the resolution factor. In this instance, 0.5 specifies that a menu should be half as big as a 1.0 sized menu. So, if the above menu size of 500 pixels was scaled by a bigness factor of 0.5, the resulting menu size would be 250 pixels. To this end, a user can scale menu items (and other displayable items as well) to increase the amount of information on a screen (by decreasing the respective size of each item) or to increase the viewable size of displayed information (by increasing the respective size of each item). Further, in accordance with one aspect of the invention, at least some applications are alerted to the current menu size whenever a change occurs. All fonts, buttons, and menus can thus be scaled to the correct size based on the current screen resolution and a user-specified "bigness" factor.

Figure 16:
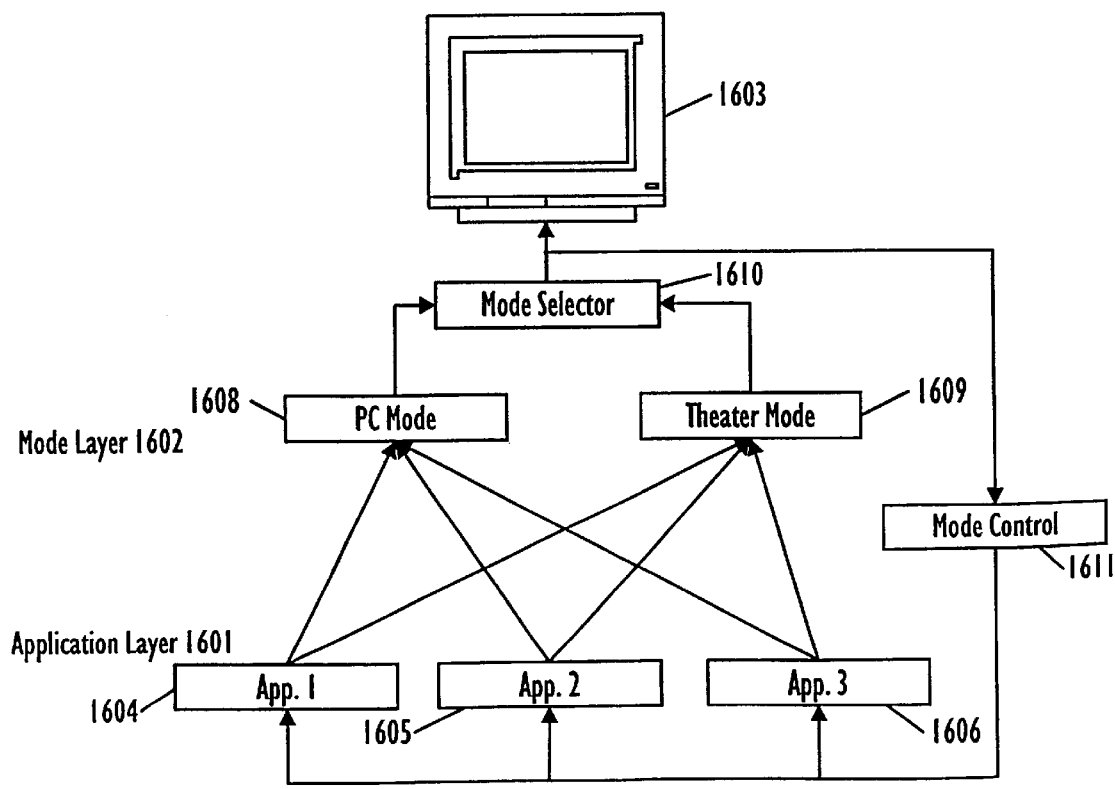
FIG. 16 shows the hierarchical processing layers as contemplated by embodiments of the present invention.

FIG. 16 shows the exchange of mode information between the different layers of the processing system of FIG. 1. Applications (app. 1 1604, app. 2 1605 and app. 3 1606) are said to reside at the application layer 1601. The mode layer 1602 shows the differing modes available to the processing system of FIG. 1. In particular, PC mode 1608 and theater mode 1609 are shown Other modes may be added as needs exist. Through the operation of the different input devices, a user selects in which mode to operate. This selection is passed to mode selector 1610 which selects from which configuration the system of FIG. 1 should be operating. The specified mode is then displayed on monitor 1603. Mode control 1611 passes to the various applications the mode in which the current system is operating. The information to be passed to the applications may be a signal indicating which mode is currently specified. Alternatively, a field may be set which is then accessed by each application in turn when executed. As the multiple applications may be running at the same time, updating all applications at once to a change in operating mode may overload the system resources of FIG. 1. To this end, alerting each application in turn, through setting a shared field, allows each application to update itself in turn when accessed by the user. Accordingly, when a user switches multiple times between PC mode and theater mode, changing only the applications that need to be changed as a user accesses them results in a savings of processing resources by not having to convert all applications when unnecessary.

Figure 17:
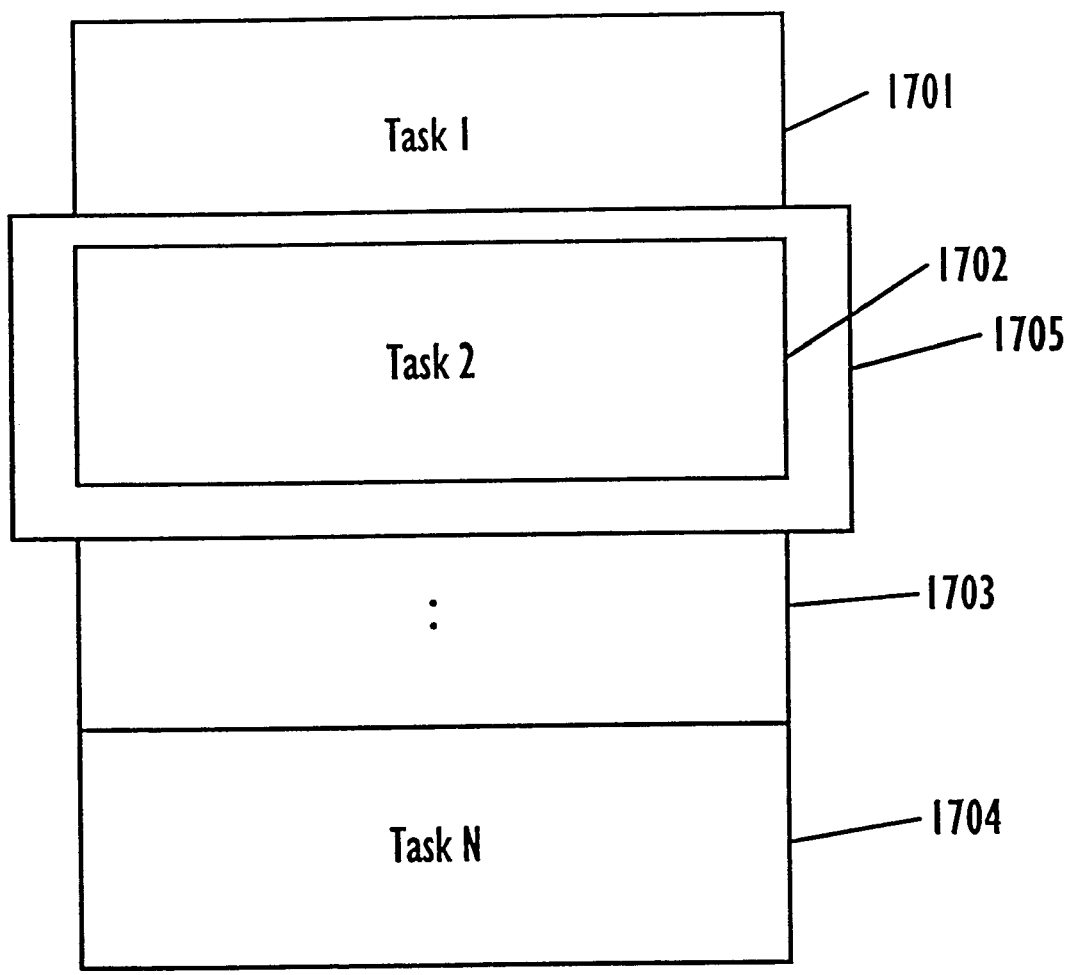
FIG. 17 shows a start menu including a focus frame as contemplated by embodiments of the present invention.

As the theater mode of the present application is intended to be viewed at a distance from the user, one enhancement includes highlighting the currently selected choice on the start menu or application menu. FIG. 17 shows an enhanced selection on the start menu. Tasks 1 1701, 2 1702, . . . N 1704 are listed on the start menu with task 2 1702 highlighted. The highlighting may assume a variety of forms. As shown in FIG. 17, the highlighting is shown by an enlarged regional window surrounding task 2 1702. To highlight the current selection in this way, the size of window 1705 is specified in a design table which is then accessed every time the user changes the current selection. Alternative highlighting measures may include changing the color, the size of the font of the highlighted task, etc. The purpose of the highlighting is to focus one's attention to the highlighted choice. For simplicity, the highlighted choice is referred to as a focus frame. An advantage of using a focus frame is that a single selection may be highlighted as compared to the altered color, multiple highlighted selections apparent in cascading menus of the prior art. In accordance with one embodiment of the invention, the focus frame surrounds a selected item and does not change the appearance of the item. In an alternate embodiment of the invention, the color and/or size of the selected item changes as well to further highlight the selection. An advantage to using a focus frame that does not change the appearance (including color and size) of the selected item is that the selection remains unaltered. Accordingly, when the selected item is an image, the image does not change appearance. An advantage of also changing the color or size of the highlighted item is that the highlighted items is more readily discernible to a user at a distance.

To specify the size of a focus frame, the border spacing and box width parameters of the operating system are controlled. Three parameters may be controlled to create the appearance of the focus frame 1705 as shown in FIG. 17. Two related parameters "x-border" and "y-border" represent the spacing between elements in the x and y directions, respectively. In FIG. 17, the x-border and y-border parameters are set to zero, resulting in the shapes (1701, 1702, 1703, and 1704) having no space between them. Alternatively, by increasing the x-border and y-border values, the spacing between the shapes (1701, 1702, 1703, and 1704) may be increased.

The third adjustable parameter is "width" which allows adjustment of the width of focus frame 1705 surrounding selection 1702. Where, as shown in FIG. 17, the value of the width parameter exceeds the values of the x-border and y-border parameters, the focus frame 1705 may overlap over non-selected items 1701 and 1703.

Another advantage of using a regional window as specified by the width parameter to create the focus frame is that it minimizes the drain on system resources as the regional window redraw function is less taxing than redrawing the entire menu with varying colors and remapping the size, shape and color of all items.

Figure 18:
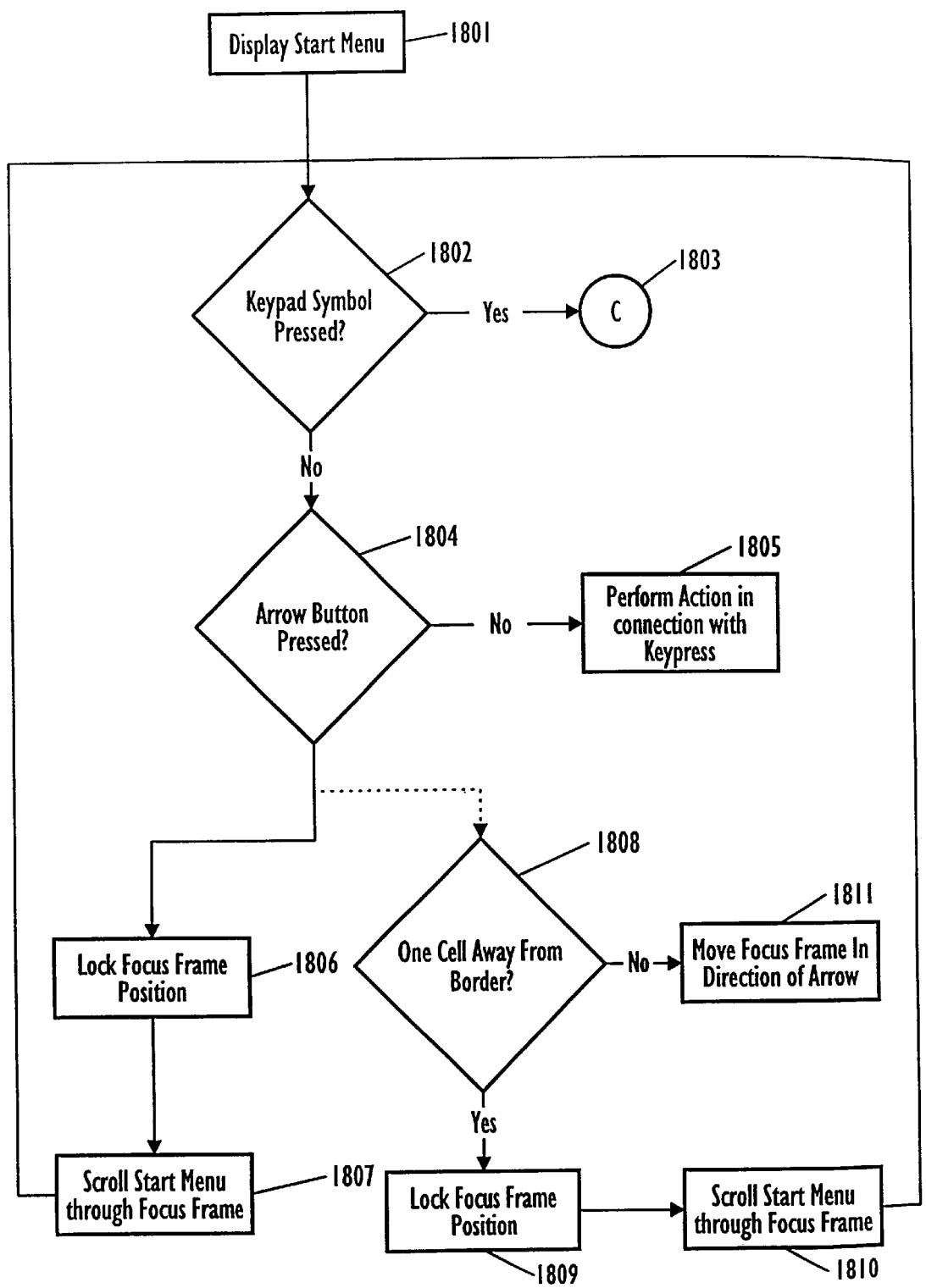
FIG. 18 shows a flowchart describing a process for moving the task or application menu in relation to the focus frame.

In one embodiment, enhanced menu scrolling techniques are used. FIG. 18 shows a flowchart which describes moving the focus frame through a menu. From a displayed menu (step 1801), the process determines whether an arrow button was pressed (step 1802) and, if not, the process branches to step 1805 where the system performs whatever appropriate action is associated with the received keypress (step 1805). For example, if a symbol or accelerator button was pressed, the system processes the pressed keypad symbol as described in greater detail with respect to FIG. 8. If an arrow button keypress was received, the process locks the focus frame in its position on display 201 (step 1806) and begins to scroll the menu through the focus frame (step 1807) which becomes fixed at a particular display area. In other words, in contrast to conventional systems, the menu choices scroll through a fixed location on the screen. Finally, the process branches back to step 1802 to await another key press.

An alternative scrolling process is described in steps 1808 through 1811. In this alternative embodiment, the process moves the focus frame until near the screen border then locks the focus frame as previously described. As shown by a dashed arrow, instead of proceeding with step 1806, the process proceeds from step 1804 to step 1808 when an arrow button is pressed. Step 1808 determines whether the focus frame is one cell away from the border of display 201. If not, the process moves the focus frame in the direction of the pressed arrow button. If the focus frame is one cell away from the border of display 201, then the process locks the position of the focus frame in its position on display 201 (step 1809) and moves the menu through the focus frame. While step 1808 shows a single cell, a number of cells may alternatively be spaced between the border and the lock position of the focus frame. An advantage in locking the focus frame at least one cell away from the border includes the ability to keep the focus frame away from the distorting effects of the edge of display 201 (for example, pin cushion effects, color shifts, etc.) as well as allowing the user to see what the next item in the list of start menu is before moving to it.

The present invention contemplates that the numerical accelerators will remain associated with the previously assigned items while the menu scrolls. An advantage of keeping the numerical accelerators associated with assigned items is that users become acquainted with the associations and expect that certain numerical accelerators are associated with certain items. These expectations by the user support the acceleration function achieved by the numerical accelerators. In this regard, some items may have multiple digit numerical accelerators.

Figure 19:
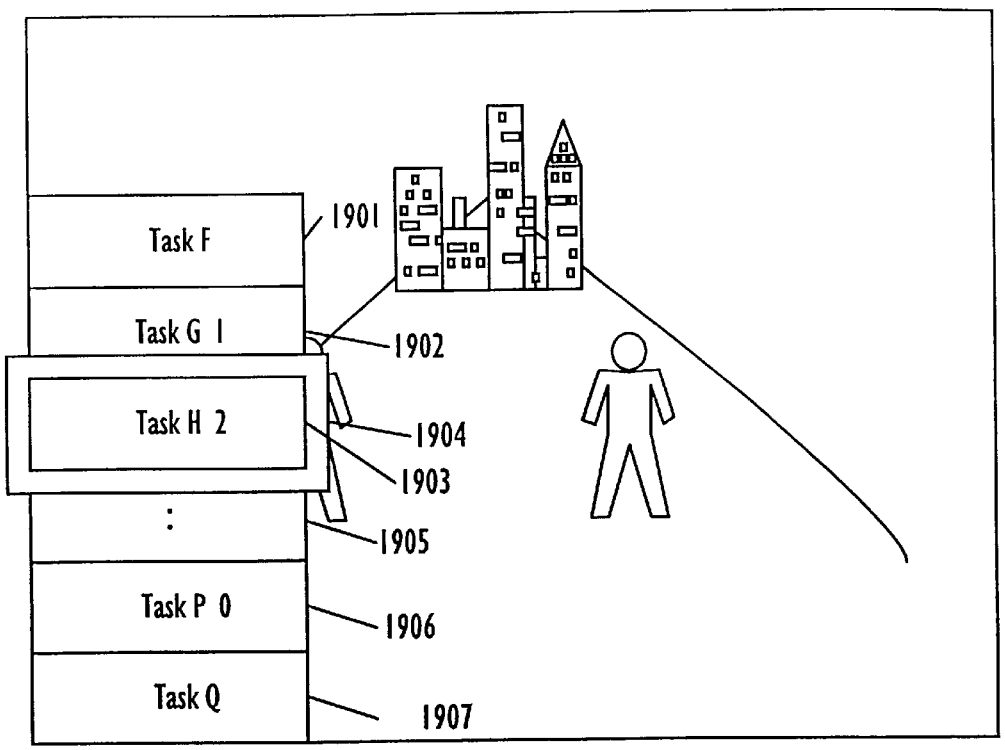
FIGS. 19, 20, and 21 show various implementations of the menu scrolling technique shown in FIG. 18 as contemplated by embodiments of the present invention.
Figure 20:
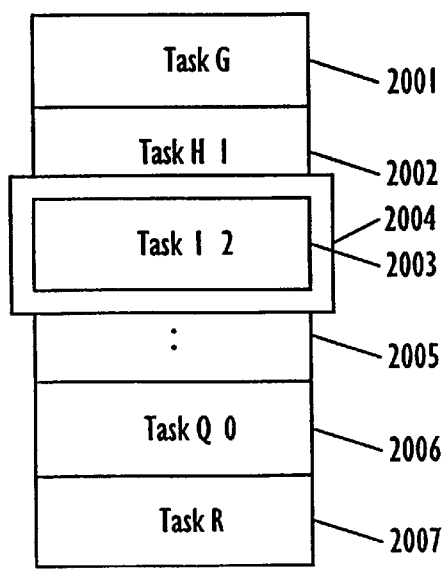

An advantage of scrolling through the display choices is evident when the number of choices for a menu exceeds the number of available accelerators. FIG. 19 shows an example of the process of FIG. 18 including display 201 with start menu tasks F 1901, G 1902, H 1903, plurality of tasks 1905, P 1906, and Q 1907. In this example the accelerators 1-0 are applied to tasks G-P. Tasks F and Q do not have an accelerator assigned to them. An alternative embodiment contemplates the numerical accelerators scrolling with the focus frame. By enabling the scrolling of the start menu, the assignment of the accelerators can be shifted as well. For example, FIG. 20 shows the embodiment of FIG. 18 using steps 1806 and 1807. Once a user has pressed a down arrow button, the start menu shifts through focus frame 2004 which remains in a fixed screen location. In FIG. 20, tasks G 2001 through task R 2007 are displayed. However, as with FIG. 19, the accelerators only cover a few tasks, specifically tasks H 2002, task I 2003, the plurality of tasks 2005 and task Q 2006. Notably, the accelerators have shifted to provide the user with a new set of options with the new display.

By conserving the number of accelerators through the enhanced functionality of the remote control's keypad, the system eliminates the need for providing unnecessary keys (for example, a separate scroll key) while retaining all of the robust functionality to a user of a fully developed and making the transition between alternative functionality of the keys seamless to the user.

Figure 21:
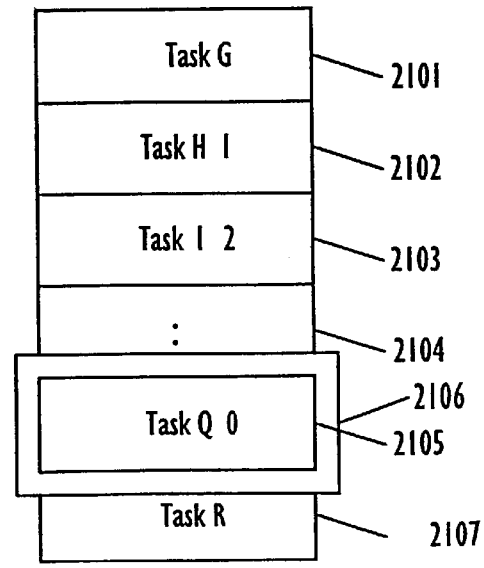

FIG. 21 shows the start menu of FIG. 19 exhibiting the process of FIG. 18, steps 1808 through steps 1811. In particular, task G 2101 no longer has an accelerator, tasks H 2102 through Q 2105 have accelerators, now task R 2107 is visible and focus frame 2106 has moved to task Q 2105.

Figure 22:
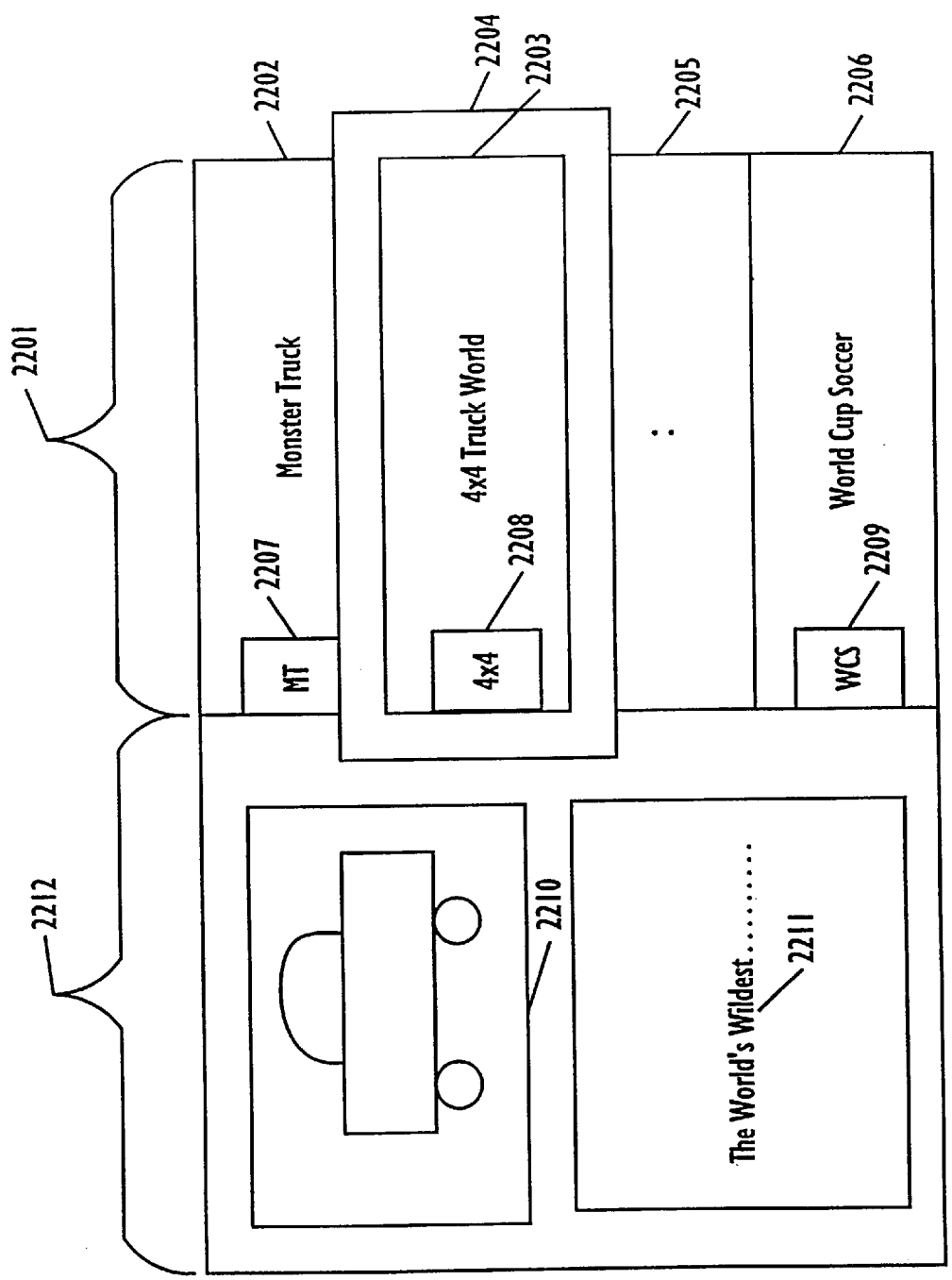
FIG. 22 shows a preview screen associated with a folder item as contemplated by embodiments of the present invention.

During operation of the menus, at times the titles of the various applications or tasks listed therein may not clearly make their contents known to the user. To more clearly represent to a user what selecting an application or task will do, embodiments of the present application incorporate a preview of the application or task as described in greater detail with respect to FIG. 22. FIG. 22 shows a start menu 2201 with application or task identifiers relating to various games. The menu 2201 shows games with application identifiers of Monster Truck 2202, 4×4 Truck World 2203, and World Cup Soccer 2206. Block 2205 represents a plurality of applications or tasks. Focus frame 2204 surrounds 4×4 Truck World 2203, highlighting it as the current selection. While not shown, for purposes of simplicity, numeric accelerators may be used as described in greater detail above in conjunction with focus frame 2204. Alternative embodiments contemplate the accelerators used in place of focus frame 2204. Beside the name of each application or task in start menu 2201 is an icon related to each application or task. For example, the Monster Truck application 2202 includes icon 2207, the 4×4 Truck World application 2203 includes icon 2208, and the World Cup Soccer application includes icon 2209.

Focus frame 2204 highlights application 2203, focusing a user's attention to the current selection. To assist the user, an application, task and/or other item 2201 each has associated with it a list of preview parameters which preview the contents of each item (or other usable information related to the item) to a user, once a specified menu item is highlighted. The combination of preview parameters is considered a preview data structure. The preview is shown in preview area 2212. The displayed preview can retrieve files which are not necessarily based on the content of the selected application or task. For example, an application or task may comprise only an audio file containing an interview. However, the preview of that file may include text, an image of the speaker, or a short movie showing the interviewee speaking. To this end, to facilitate the quick execution of various previews when an application is selected, the preview data structure allows for quick execution and display of the preview and does not require (nor prohibit) the launching of the executable associated with the application identifier shown in start menu 2201. Alternative embodiments of the present invention contemplate the preview being even more disassociated from the content of the selected application 2203. For example, the preview files associated with the 4×4 Truck World application 2203 may relate to a commercial advertising the latest fishing supplies.

Present embodiments contemplate the preview data structure to provide for a variety of multimedia presentations. For example, a preview data structure may include specified text, audio, and video previews or clips which can relate to the content of the application or task. An example of a suitable preview data structure is represented below:

preview<App Name>=
previewtext<App Name>_review.txt
previewaudio=<App Name>_review.aud
previewmovie=<App Name>_review.mpg where <App Name> is the name of the application represented in the start menu 2201. The .txt, .aud, and .mpg file types are some of the many files available for use. Other file types may also be used including RealAudio and RealVideo files, .doc files, Gif files, JPEG files, and the like. Applied to the present example of FIG. 22, where the 4×4 Truck World application 2203 is currently highlighted, the preview file associated with the application 2203 is "preview4×4 Truck World". Alternative representations of the application name may be used in place of the preview file data structure name. For example, the application name for "4×4 Truck World" may be concatenated to "4×4", making the preview data structure's name "preview4×4".

Figure 23:
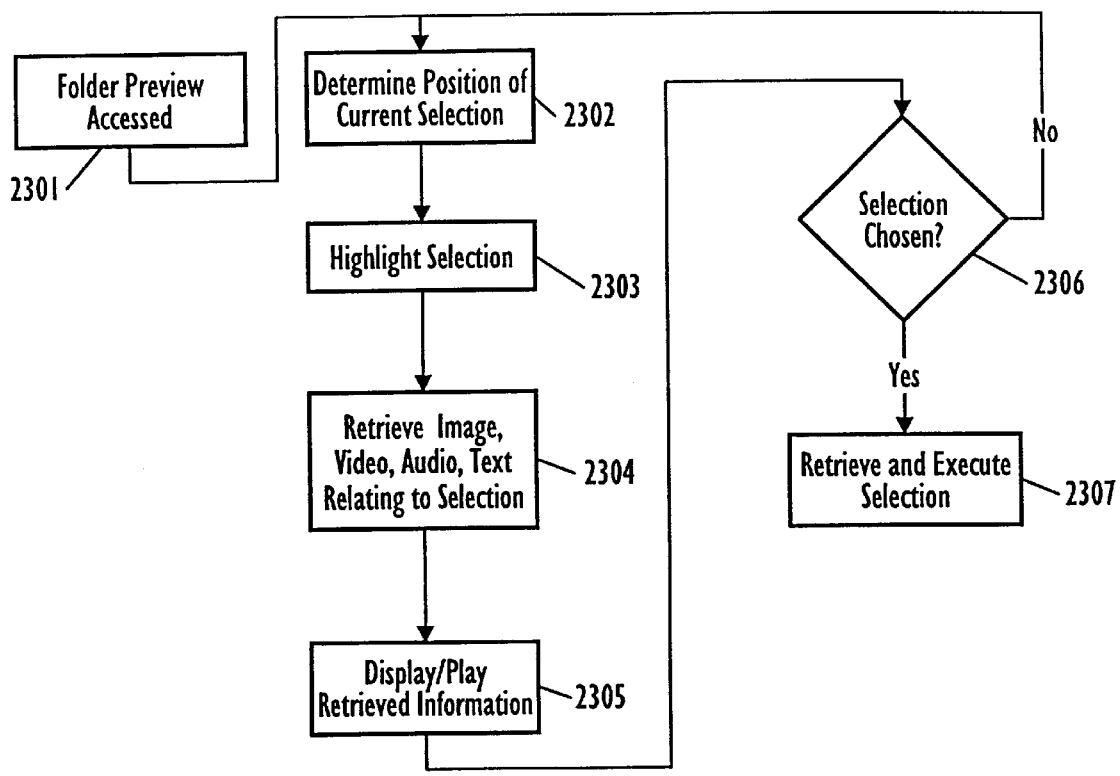
FIG. 23 shows a flowchart for a process for displaying the contents of a preview screen shown in FIG. 22 as contemplated by embodiments of the present invention.

The icon or movie or animation 2210 displays information associated with highlighted application 2203. Also, text 2211 provides some further descriptive text associated with highlighted application 2203. The process associated with the selection and execution of the preview information is shown in greater detail in FIG. 23. Once the folder preview function of the start menu is initiated (by user designation or automatically by the system of FIG. 1 when a user highlights an item at 2301), the process determines which application or task is currently being highlighted 2302. The process then retrieves the preview files associated with the current selection 2304 and displays or plays (as appropriate) the retrieved preview files 2305. In step 2306, the process determines whether the selection was chosen by the user for execution. If so, the process retrieves and executes the selected application in step 2307. If not, the process continues to display the preview (at step 2308) until the users' focus moves to another highlighted item (or until some other action takes place which takes the system out of preview mode). If the another item is highlighted, the process returns back to step 2302 where the new position of the current highlighted item is determined and previewed accordingly.

Alternatively, files relating to the preview of any task or application can be stored at a remote location. To access these files at the remote location, the file name as specified in the preview data structure described above may include the entire address of the file so that one may retrieve the remotely stored preview file. For example, the entire address of the file may include the URL of the file as accessible over the a network such as an intranet or the Internet. An advantage of storing the preview file at a remote location includes the ability to quickly update the remotely stored file and have users see the new preview when next accessed by the users' system. Using a remotely stored file and a URL in an application pointing to it, the provider of the preview file may additionally provide time sensitive previews (including time sensitive offers, etc.) for various purposes including advertising purposes and the like.

Of course, it should be understood that the configuration of the modules discussed above is merely by way of example, and that it is contemplated that other configurations and additional (or fewer) modules could also have been implemented.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C or C++ programming language.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A system comprising:
   a computer;
   an input device coupled to the computer which receives input from a user; and
   a display device coupled to the computer, wherein the display device can be operated in one of a plurality of screen resolutions;
   wherein the computer controls the display device to generate menus of a particular physical size relative to the display device screen size in accordance with a sizing factor input from the user, such that a user can control the size of the menus independently of resolution changes caused by changing to a different screen resolution.

2. The system of claim 1, wherein the computer multiplies the sizing factor entered by the user with a current screen resolution to determine the size of the menu.

3. A method comprising:
   operating a display device coupled to a computer in one of a plurality of screen resolutions;
   receiving at a computer input from a user via an input device;
   controlling said display device to generate menus of a particular physical size relative to the display device screen size by determining a ratio of screen size to menu size in accordance with input from the user, such that a user can control the size of the menus independently of resolution changes caused by changing to a different screen resolution.

4. The method of claim 3, wherein the computer in said controlling step multiplies a sizing factor entered by the user with a current screen resolution to determine the size of the menu.

5. A computer-readable medium having computer executable instructions for performing steps comprising:

operating a display device coupled to a computer in one of a plurality of screen resolutions;

receiving at a computer input from a user via an input device;

controlling said display device to generate menus of a particular physical size relative to the display device screen size accordance with a sizing factor input from the user, such that a user can control the size of the menus independently of resolution changes caused by changing to a different screen resolution.

6. The computer-readable medium of claim 5 having further computer-executable instructions for performing the step of:

multiplying the sizing factor entered by the user with a current screen resolution to determine the size of the menu.

7. The system of claim 1 wherein the system calculates a resolution factor, said resolution factor being the ratio of an aspect of a current display resolution to a corresponding aspect of a predefined resolution of a menu to be displayed.

8. The system of claim 7 wherein the aspect of a current display resolution is a horizontal resolution and corresponds to a horizontal resolution of the predefined resolution of the menu to be displayed.

9. The system of claim 7 wherein the aspect of a current display resolution is a vertical resolution and corresponds to a vertical resolution of the predefined resolution of the menu to be displayed.

10. The system of claim 7 wherein the aspect of a current display resolution is a combination of horizontal and vertical resolutions and corresponds to horizontal and vertical resolutions of the predefined resolution of the menu to be displayed.

11. The system of claim 7 wherein the resolution factor is multiplied by the sizing factor.

12. The system of claim 11 wherein the sizing factor is in the range of 0.0 to 1.0.

13. The system of claim 12 wherein the sizing factor is in the range of 0.5 to 1.0.

14. The method of claim 3 further comprising calculating a resolution factor, said resolution factor being a ratio of an aspect of a current display resolution to a corresponding aspect of a predefined resolution of a menu to be displayed.

15. The method of claim 14 wherein the aspect of a current display resolution is a horizontal resolution and corresponds to a horizontal resolution of the predefined resolution of the menu to be displayed.

16. The method of claim 14 wherein the aspect of a current display resolution is a vertical resolution and corresponds to a vertical resolution of the predefined resolution of the menu to be displayed.

17. The method of claim 14 wherein the aspect of a current display resolution is a combination of horizontal and vertical resolutions and corresponds to horizontal and vertical resolutions of the predefined resolution of the menu to be displayed.

18. The method of claim 14 wherein the input from the user comprises a sizing factor.

19. The method of claim 18 comprising multiplying the resolution ratio by the sizing factor.

20. The method of claim 19 wherein the sizing factor is in the range of 0.0 to 1.0.

21. The method of claim 20 wherein the sizing factor is in the range of 0.5 to 1.0.

22. The computer-readable medium of claim 5 having further computer-executable instructions for calculating a resolution factor, said resolution factor being a ratio of an aspect of a current display resolution to a corresponding aspect of a predefined resolution of a menu to be displayed.

23. The computer-readable medium of claim 22 wherein the aspect of a current display resolution is a horizontal resolution and corresponds to a horizontal resolution of the predefined resolution of the menu to be displayed.

24. The computer-readable medium of claim 22 wherein the aspect of a current display resolution is a vertical resolution and corresponds to a vertical resolution of the predefined resolution of the menu to be displayed.

25. The computer-readable medium of claim 22 wherein the aspect of a current display resolution is a combination of horizontal and vertical resolutions and corresponds to horizontal and vertical resolutions of the predefined resolution of the menu to be displayed.

26. The computer-readable medium of claim 22 having further computer-executable code for multiplying the resolution ratio by the sizing factor.

27. The computer-readable medium of claim 26 wherein the sizing factor is in the range of 0.0 to 1.0.

28. The computer-readable medium of claim 27 wherein the sizing factor is in the range of 0.5 to 1.0.

* * * * *

UNITED STATES PATENT AND TRADEMARK OFFICE
CERTIFICATE OF CORRECTION

PATENT NO.    : 6,344,865 B1  
DATED         : February 5, 2002  
INVENTOR(S)   : Joseph H. Matthews, III et al.

It is certified that error appears in the above-identified patent and that said Letters Patent is hereby corrected as shown below:

Column 3,  
Line 51, "task" has been replaced with -- task, --.

Column 6,  
Line 3, "star–up" has been replaced with -- start–up --.

Column 7,  
Line 14, "by" has been deleted.

Column 11,  
Line 55, "Net" has been replaced with -- Next --.

Column 15,  
Line 35, "review.txt" has been replaced with -- preview.txt --,  
Line 36, "review.aud" has been replaced with -- preview.aud --,  
Line 37, "review.mpg" has been replaced with -- preview.mpg --.

Signed and Sealed this

Eleventh Day of February, 2003

JAMES E. ROGAN  
*Director of the United States Patent and Trademark Office*